(12) United States Patent
Calmer

(10) Patent No.: US 10,674,665 B2
(45) Date of Patent: Jun. 9, 2020

(54) STALK ROLL

(71) Applicant: Marion Calmer, Lynn Center, IL (US)

(72) Inventor: Marion Calmer, Lynn Center, IL (US)

( * ) Notice: Subject to any disclaimer, the term of this patent is extended or adjusted under 35 U.S.C. 154(b) by 0 days.

(21) Appl. No.: 15/400,551

(22) Filed: Jan. 6, 2017

(65) Prior Publication Data

US 2017/0172067 A1   Jun. 22, 2017

Related U.S. Application Data

(63) Continuation of application No. 13/327,398, filed on Dec. 15, 2011, now Pat. No. 9,560,804.

(60) Provisional application No. 61/423,192, filed on Dec. 15, 2010.

(51) Int. Cl.
*A01D 45/02* (2006.01)

(52) U.S. Cl.
CPC .......... *A01D 45/025* (2013.01); *A01D 45/021* (2013.01)

(58) Field of Classification Search
CPC .............................. A01D 45/021; A01D 45/025
See application file for complete search history.

(56) References Cited

U.S. PATENT DOCUMENTS

| | | |
|---|---|---|
| 730,671 A | 6/1903 | Luce |
| 1,429,168 A | 9/1922 | Scott |
| 1,827,216 A | 10/1931 | Henry |
| 2,534,665 A | 12/1950 | Greeley |
| 2,534,685 A | 12/1950 | Shrader |
| 2,575,120 A | 11/1951 | Peel |
| 2,604,750 A | 7/1952 | Fergason |
| 2,616,236 A | 11/1952 | Hartley |
| 2,870,593 A | 1/1959 | Anderson |
| 2,934,877 A | 5/1960 | Fowler |
| 3,101,579 A | 8/1963 | Karlsson et al. |
| 3,101,720 A | 8/1963 | Karlsson |
| 3,174,484 A | 3/1965 | Anderson |
| 3,222,852 A | 12/1965 | Millman et al. |
| 3,271,940 A | 9/1966 | Ashton et al. |
| 3,304,702 A | 2/1967 | Russell |
| 3,462,928 A | 8/1969 | Schreiner et al. |
| 3,496,708 A | 2/1970 | Bornzin |
| 3,517,490 A | 6/1970 | Mathews |

(Continued)

FOREIGN PATENT DOCUMENTS

| | | | |
|---|---|---|---|
| DE | 102005054998 A1 | 5/2007 | |
| FR | 2599931 | 6/1987 | |
| WO | WO-0030427 A1 * | 6/2000 | ........... A01D 45/025 |

OTHER PUBLICATIONS

"Installation and Operating Instructions—Model 402, 303, 304 & 404 Corn Head" p. 28-30.

(Continued)

*Primary Examiner* — Alicia Torres
(74) *Attorney, Agent, or Firm* — McKee, Voorhees & Sease, PLC

(57) ABSTRACT

One embodiment of a stalk roll to be mounted upon a stalk roll drive shaft of a corn harvesting header comprises a cylindrical shell with a recess in the main cylinder, wherein reduced flutes are not present in the recess, but full flutes are present therein. This embodiment includes a stalk slot having a length equal to the length of the recess. Additionally, the flutes may be configured such that a stalk engagement gap is present at least once during a full revolution of two opposing stalk rolls.

4 Claims, 32 Drawing Sheets

(56) References Cited

U.S. PATENT DOCUMENTS

| | | |
|---|---|---|
| 3,524,308 A | 8/1970 | H |
| 3,584,444 A | 6/1971 | W et al. |
| 3,633,348 A | 1/1972 | Sears et al. |
| 3,705,485 A | 12/1972 | Toomer |
| 3,707,833 A | 1/1973 | Sutton |
| 3,831,356 A | 8/1974 | Maiste et al. |
| 3,858,384 A | 1/1975 | Maiste et al. |
| 4,219,990 A | 9/1980 | Hill |
| 4,227,366 A | 10/1980 | Pucher |
| 4,233,804 A | 11/1980 | Fischer et al. |
| 4,377,062 A | 3/1983 | Slattery |
| 4,429,516 A | 2/1984 | Erickson |
| 4,445,314 A | 5/1984 | Gust |
| 4,845,930 A | 7/1989 | Dow |
| 5,009,061 A | 4/1991 | Heuling |
| 5,040,361 A | 8/1991 | Briesemeister |
| 5,060,464 A | 10/1991 | Caron |
| 5,161,356 A | 11/1992 | Pick |
| 5,282,352 A | 2/1994 | Schoolman et al. |
| 5,404,699 A | 4/1995 | Christensen et al. |
| 5,680,750 A | 10/1997 | Stefl |
| 5,704,202 A | 1/1998 | Calmer |
| 5,775,076 A | 7/1998 | Mossman |
| 5,787,696 A | 8/1998 | Wiegert et al. |
| 5,878,559 A | 3/1999 | Cooksey et al. |
| 6,050,071 A | 4/2000 | Bich et al. |
| 6,216,428 B1 | 4/2001 | Becker et al. |
| 5,878,561 A1 | 4/2005 | Look et al. |
| 7,237,373 B2 | 7/2007 | Resing et al. |
| 7,373,767 B2 | 5/2008 | Calmer |
| 7,788,890 B2 | 9/2010 | Cressoni |
| 7,886,510 B2 | 2/2011 | Calmer |
| 8,220,237 B1 | 7/2012 | Calmer |
| 8,464,505 B1 | 6/2013 | Calmer |
| 10,537,058 B2 * | 1/2020 | Ehle .................. A01D 34/44 |
| 2003/0172639 A1 * | 9/2003 | Calmer ............... A01D 45/025 56/51 |
| 2007/0266689 A1 | 11/2007 | Calmer |
| 2014/0182255 A1 | 7/2014 | Calmer |

OTHER PUBLICATIONS

"International Operator's Manual 800 Series Corn Heads", 1978, p. 14-15, International Harvestor Co.

Allis-Chalmers, compiled by Alan C. King, "An Informal History" 1918-1960.

Operator's Manual, "International 234 Sweet Corn Harvester", 1969, p. 7-15, International Havestor.

Operator's Manual, "International 700 Series Corn Heads for 815 and 915 Combines"; 1973, p. 8-9, IHC.

Operator's Manual, "John Deere No. 227 Corn Picker Two-Row Mounted" p. 13-15, p. 21-24, date unknown.

Operator's Manual, "McCormick International 234 Corn Harvestor", 1966, p. 8-9, McCormic Int.

Pre-Delivery Instructions, "John Deere 210 Corn Attachment", 1963, .37-38, John Deere.

Search Report and Written Opinion, dated Jul. 7, 2014 for PCT/US2014/024716.

The Old and the New in Corn Culture, Yearbook of the United States Departement of Agriculture.

* cited by examiner

STALK ROLL

CROSS REFERENCE TO RELATED APPLICATIONS

Applicant claims priority from provisional U.S. Pat. App. No. 61/423,192 filed on Dec. 15, 2010, and Applicant states that the present application claims priority from and is a continuation of U.S. patent application Ser. No. 13/327,398 filed on Dec. 15, 2011, all of which applications are incorporated by reference herein in their entireties.

FIELD OF THE INVENTION

The apparatus described herein is generally applicable to the field of agricultural equipment. The embodiments shown and described herein are more particularly for improved harvesting of corn plants.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

BACKGROUND OF THE INVENTION

Modern agriculture techniques require that during separation of a corn plant ear (or "ear") from a stalk (or "stalk") corn harvesting machines optimize the following considerations: (1) increase the rate of ear separation; (2) ensure that the corn plant is not severed from its root system during harvesting; (3) increase the speed at which stalks are ejected from the row unit; (4) retain minimal amounts of material other than ears ("MOTE") in the heterogeneous material being delivered to the harvesting machine for threshing; and, (5) lacerate and/or penetrate the shell of the stalk to expose the internal portions for accelerated decomposition of the stalk.

As shown in FIG. 1, modern corn headers are provided with a plurality of row crop dividers for retrieving, lifting, and directing the rows of stalks toward their respective corn plant engagement chambers. The corn plant engagement chamber is defined herein as the portion of the corn head row unit that engages the stalk and separates the ear from the corn plant. FIG. 1A shows the top view of two stalk rolls found in the prior art. Gathering chains located in the corn plant engagement chamber draw the stalks and/or ears towards the header. Stalk rolls located beneath the gathering chains pull the stalks rapidly downward, returning the stalk to the field. These stalk rolls are typically powered by a gearbox. As the stalk rolls rotate, the flutes on the stalk rolls engage and pull the stalks downward. Two stripper plates located above the stalk rolls, with one stripper plate on either side of the corn row, are spaced wide enough to allow the stalks and leaves to pass between them but narrow enough to retain the ears. This causes the ears to be separated from the corn plant as the stalk is pulled down through the stripper plates. The stalk rolls continue to rotate and eject the unwanted portions of the corn plant below the corn plant engagement chamber, thereby returning the unwanted portions of the corn plant to the field.

The performance of stalk rolls found in the prior art, as shown in FIGS. 3-5, has been found to be less than optimal. Attempts at increasing stalk roll performance and increasing ear separation speed have been made by increasing rotational speed of the stalk rolls. These attempts have been largely unsuccessful because stalk rolls having uniform length flutes rotating at high speeds simulate a solid rotating cylinder (sometimes referred to as an "egg-beater effect"), which restricts entry of the corn plant into the corn plant engagement chamber. The diameter of the simulated rotating cylinder is approximately equal to the distance from the tip of a first flute on a given stalk roll to the tip of a second flute oriented closest to 180 degrees from the first flute (i.e., two opposed flutes on a given stalk roll). This rotating-cylinder effect prevents individual flutes from engaging the stalk and restricts corn plants from entering the corn plant engagement chamber. Thus, stalk engagement is hindered and the corn plant hesitates and does not enter the corn plant engagement chamber.

The prior art has attempted to increase the performance of cutting or chopping stalk rolls by simply adding more flutes to the stalk rolls. In prior art applications, this reduces the performance of the stalk rolls because during rotation of the stalk rolls, a semi-continuous wall of steel restricts entry of the stalk into the corn plant engagement chamber, as noted above. Adding flutes decreases the likelihood of a stalk entering the space between two opposing stalk rolls. That is, as more flutes are added to the stalk roll, rotation of the stalk roll causes the stalk roll to more closely simulate a rotating cylinder. When viewed along the axis of rotation of the stalk roll (the direction from which the stalk rolls would approach the stalk), adding more flutes restricts the ability of the stalks to enter the corn plant engagement chamber due to interference from the ends of the flutes.

When the gathering chain paddle passes above the stripper plates and engages a stalk that is restricted from entering the corn plant engagement chamber, the gathering chain paddle will likely break or sever the stalk prior to ear separation. Stalk severance prior to ear separation increases intake of MOTE to the harvesting machine, thereby increasing horsepower and fuel requirements. Difficulty in stalks entering the area between to stalk rolls may also cause ear separation to take place near the opening of the row unit and allow loose ears to fall to the ground, thereby becoming irretrievable.

FIG. 3 shows prior art opposing stalk roll designs utilizing six flutes that inter-mesh and overlap. When the flutes of this type engage the stalk, the flutes alternately apply opposing force. This knife-edge relationship causes at least two problems. First, the corn plants are violently tossed from side to side causing premature separation of loosely attached ears, thereby permitting the ear to fall to the ground and become irretrievable. Second, the stalk is cut or snapped at a node causing long, unwanted portions of the stalk and leaves to stay attached to the ear and remain in the row unit. This increases the amount of MOTE the harvesting machine must process. This problem is compounded as the number of row units per corn head is increased.

FIG. 4 shows the prior art stalk roll design with inter-meshing knife edges as described in U.S. Pat. No. 5,404,699. As shown, the stalk rolls have six outwardly extending integral flutes. Each flute has a knife edge that is provided with a leading surface and a trailing surface. The leading surface of the knife edge has a ten degree forward (with respect to the rotation of the stalk roll) slope and the trailing surface has a thirty degree reverse slope (with respect to the rotation of the stalk roll), both of which slopes are defined with respect to a line extending through the vertex of the knife edge and the central longitudinal axis of the stalk roll. Therefore, the leading surface is steeper than the trailing surface of each knife edge. The radially extending flutes are interleaved with one another in an intermeshing-type arrangement. The stalk rolls may be mounted in a cantilevered arrangement; or alternatively, in an arrangement employing nose bearings. The stalk roll comprises a cylindrical shell formed by two semi-cylindrical pieces that are clamped about a drive shaft. Bolts extend between the two semi-cylindrical pieces to pull the pieces together, thereby clamping the stalk rolls to the drive shaft.

This design, upon restricted engagement of the stalk roll with the stalk, allows the knife edges to cut stalks before pulling the stalks through the stripper plates to separate the ear from the stalk, effectively leaving the upper portion of the corn plant free to float in the corn row unit as shown in FIG. 3. This requires the harvesting machine threshing components to process a substantial portion of the stalk, which increases harvesting machine horsepower and fuel requirements.

FIG. 5 shows the design disclosed by U.S. Pat. No. 6,216,428, which is a stalk roll having bilaterally symmetric flutes with knife edges that are adjacent and overlap in the shear zone area. This design produces a shearing and cutting of the stalk using a scissor configuration produced by the leading and trailing edges of the opposing knife-edged flutes. Again, the stalks are cut off prior to ear separation. This is sometimes referred to as a "scissor effect" and also results in the need to process increased amounts of MOTE.

Case IH corn heads built prior to development of U.S. Pat. No. 6,216,428 used stalk rolls having four knives that are bolted to a solid shaft. Adjacent stalk rolls are registered with one another so that as the stalk rolls are rotated, the knives of the opposing stalk rolls are also opposing rather than intermeshing. In an opposing arrangement, the knives come into contact with opposite sides of the stalk at the same general height of the stalk, thereby lacerating the stalk for accelerated decomposition. It is important that the blades are correctly registered with one another, and that the blades are correctly spaced from one another. The stalk rolls used on Case IH corn heads require nose bearings at the forward end (with respect to the direction of travel of the harvesting machine during threshing) of the stalk rolls to operate properly and may not be mounted in a cantilevered arrangement.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 15 A is a cross-sectional view of the stalk rolls from FIG. 15 at line 15A.

FIG. 15 B is a cross-sectional view of the stalk rolls from FIG. 15 at line 15B.

FIG. 15 C is a cross-sectional view of the stalk rolls from FIG. 15 at line 15C.

FIG. 16 A is a cross-sectional view of the stalk rolls from FIG. 16 at line 16A.

FIG. 16 B is a cross-sectional view of the stalk rolls from FIG. 16 at line 16B.

FIG. 16 C is a cross-sectional view of the stalk rolls from FIG. 16 at line 16C.

FIG. 17 A is a cross-sectional view of the stalk rolls from FIG. 17 at line 17A.

FIG. 17 B is a cross-sectional view of the stalk rolls from FIG. 17 at line 17B.

Figure 1A:
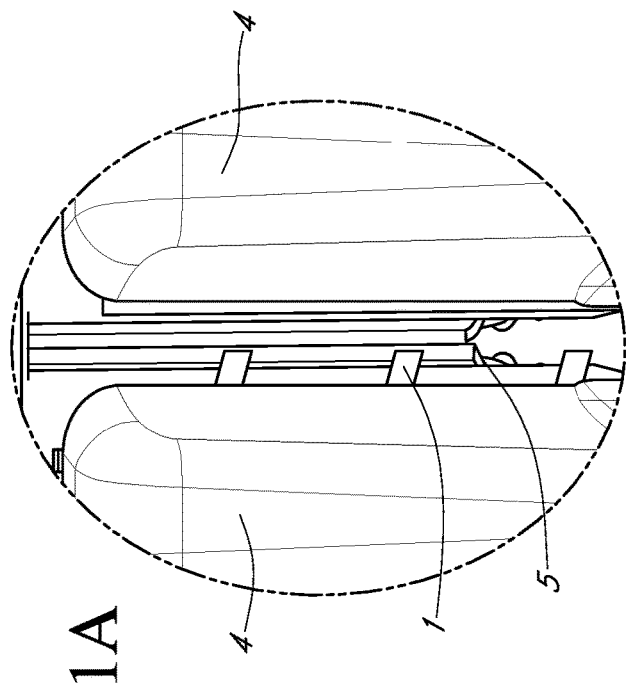
FIG. 1A is an exploded top view of a portion of one row unit of FIG. 1 of the prior art showing a portion of the corn plant engagement chamber.
Figure 1:
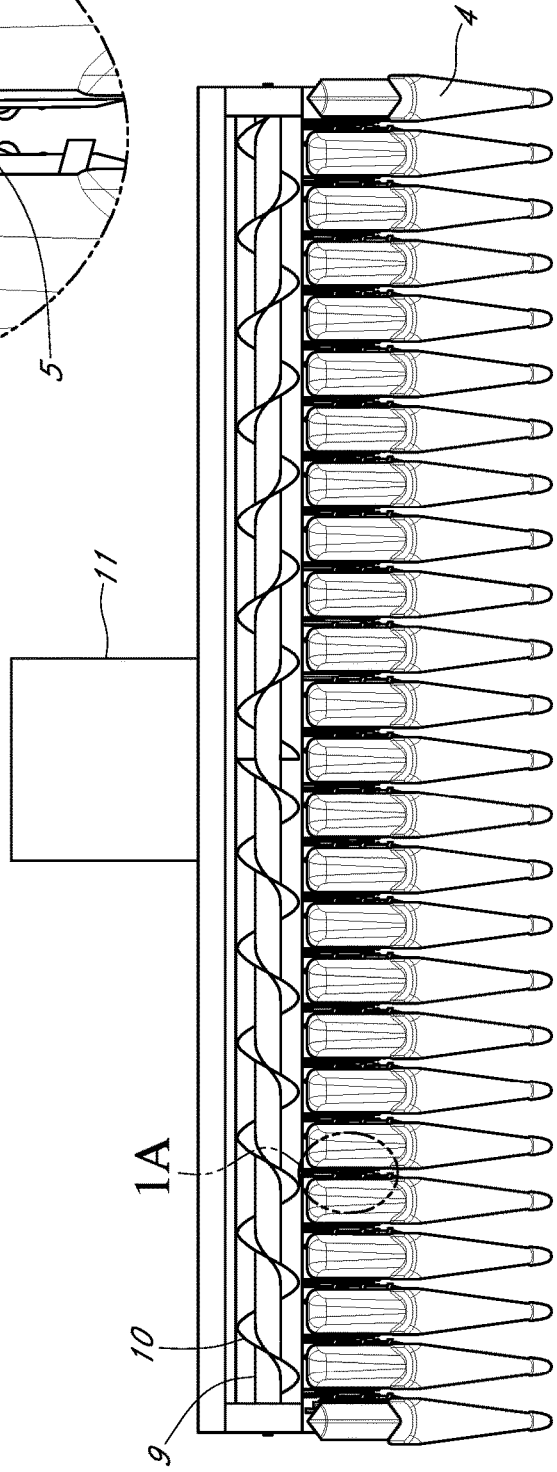
FIG. 1 is a top view of a corn head that contains a cross auger, a feeder house, a frame, and multiple row units of the prior art.
Figure 2:
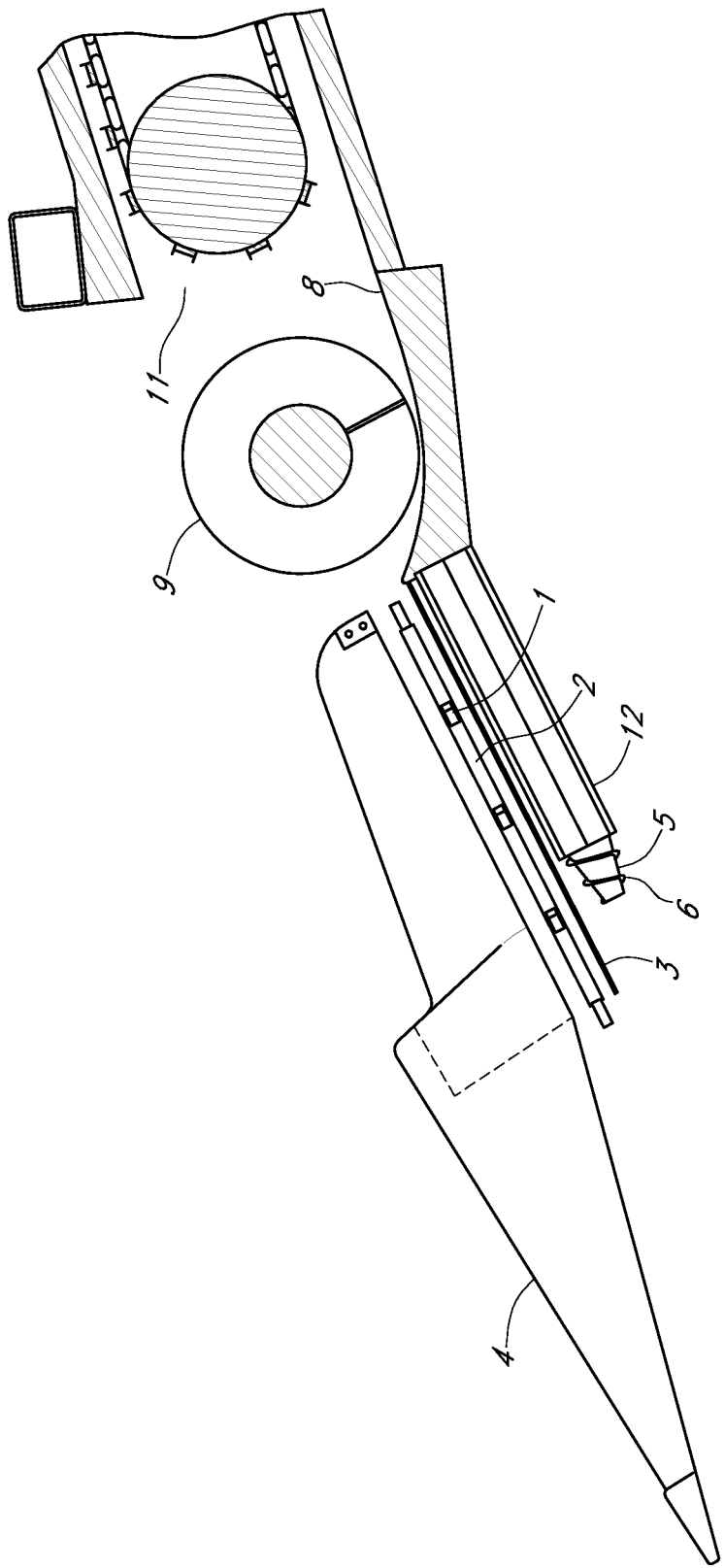
FIG. 2 is a cross-sectional view along the plane of A-A of one row unit, the cross auger, the cross auger trough, the feeder house, and the gathering chain from FIG. 1, as disclosed in the prior art.
Figure 3:
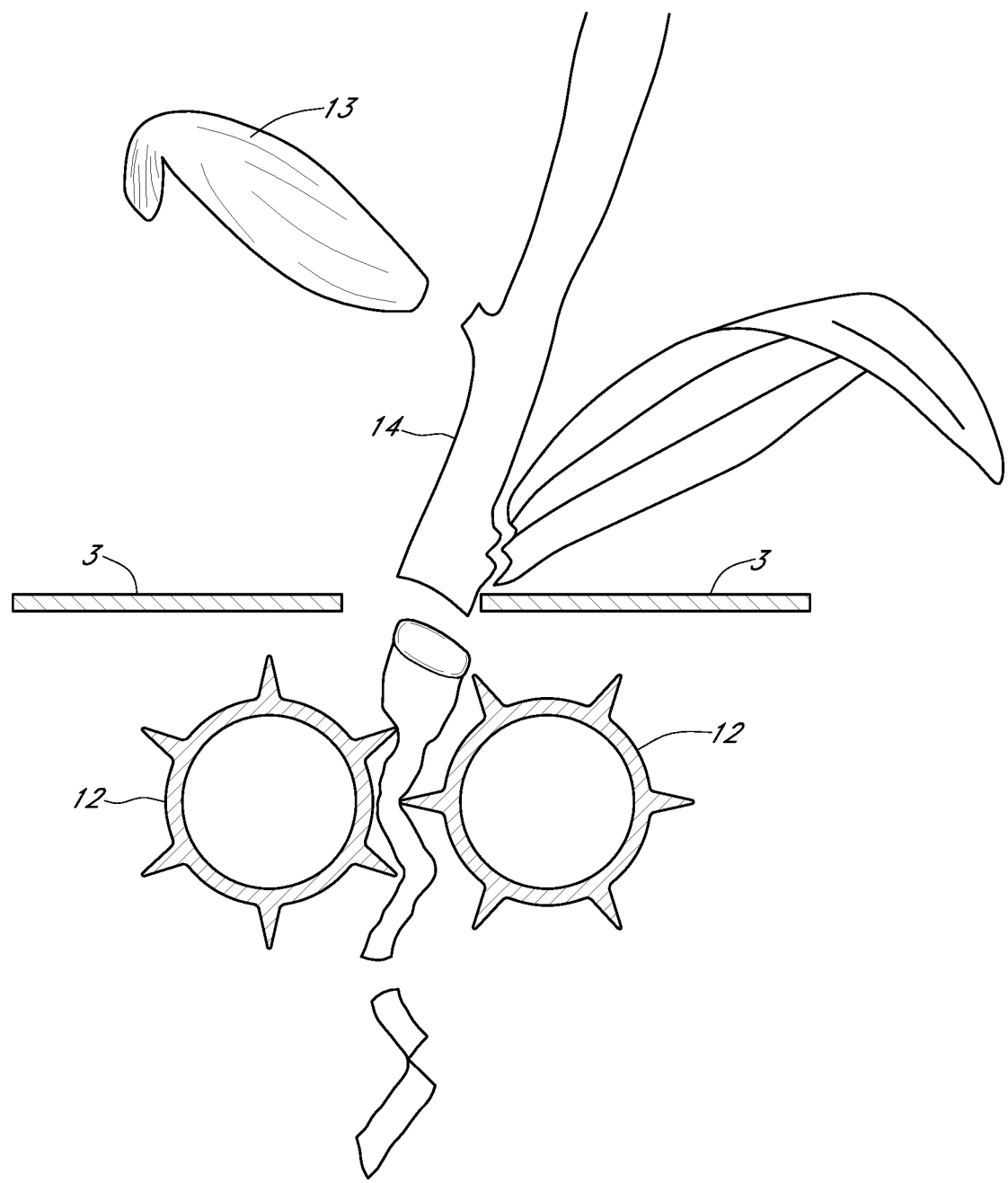
FIG. 3 is a cross-sectional view of a portion of the corn head shown in FIG. 1 along the plane F highlighting the stalk rolls and stripper plates of one row unit of the prior art engaged with and shearing a corn plant.
Figure 4:
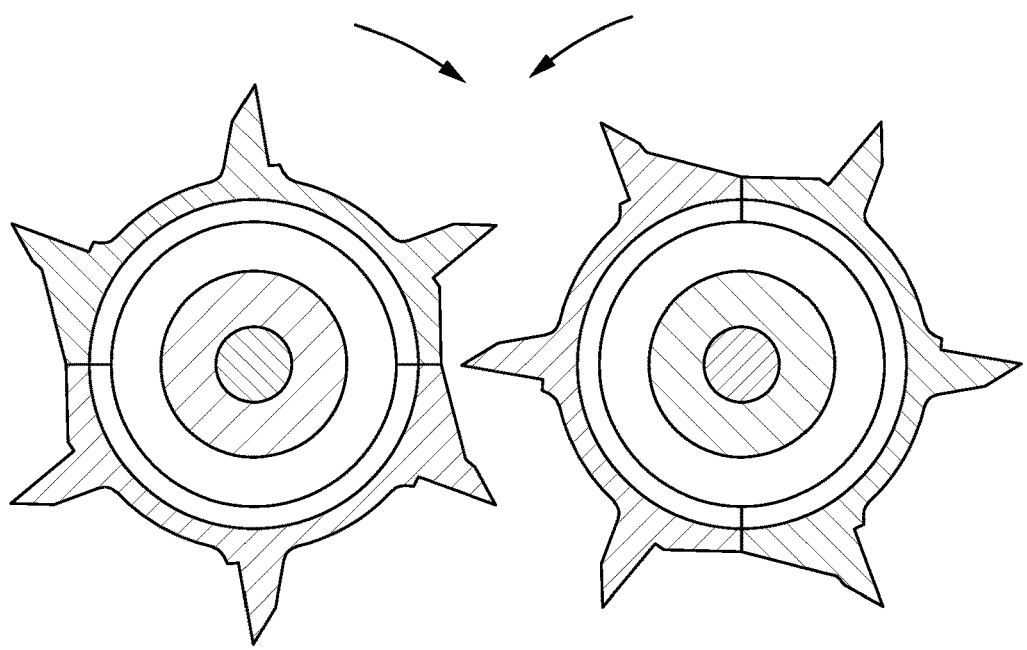
FIG. 4 is an end view of a pair of cutting-type stalk rolls as disclosed in the prior art.
Figure 5:
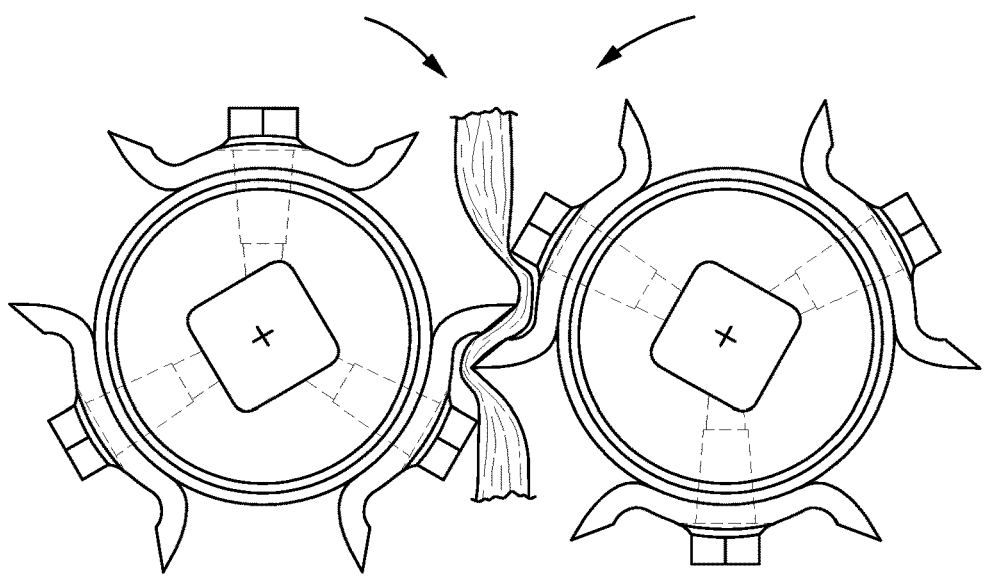
FIG. 5 is an end view of a pair of shearing-type stalk rolls as disclosed in the prior art.

| DETAILED DESCRIPTION-ELEMENT LISTING | |
|---|---|
| ELEMENT DESCRIPTION | ELEMENT # |
| Gathering chain paddle | 1 (110) |
| Gathering chain | 2 (120) |
| Stripper plate | 3 (130) |
| Row divider | 4 (100) |
| Nose cone | 5 |
| Transport vane | 6 (170) |
| Stalk slot | 7 |
| Cross auger trough | 8 (200) |
| Cross auger | 9 (220) |
| Cross auger fighting | 10 (230) |
| Feeder house | 11 |
| Stalk roll (Prior Art) | 12 |
| Ear | 13 (300) |
| Outer shell of stalk | 14 (321) |
| First (right) stalk roll | 15 |
| Second (left) stalk roll | 16 |
| Cylindrical shell | 17 |
| First flute | 18 |
| Second flute | 19 |
| Third flute | 20 |
| Fourth flute | 21 |
| Knife edge | 22 |
| Leading surface | 23 |
| Trailing surface | 24 |
| Stalk engagement gap | 25 |
| Fifth flute | 26 |
| Semi-cylindrical shell (Upper) | 27 |
| Semi-cylindrical shell (Lower) | 28 |
| Stalk roll drive shaft | 29 |
| Annular ridge | 30 |
| Short bolt hole | 31 |
| Short bolt | 32 |
| Sixth flute | 33 |
| Bolt receiver | 34 |
| Long bolts | 36 |
| Long bolt hole | 37 |
| Intermediate drive shaft | 38 |
| Drive shaft bolt | 39 |
| Small pin | 40 |
| Large pin | 41 |
| Row unit cover | 100 |
| Ear separation chamber | 140 |
| Short flute | 180 |
| Tapered flute | 181 |
| Intermediate flute | 182 |
| Long flute | 183 |
| Stalk roll | 190 (192) |
| Underside of leaf | 310 |
| Stalk | 320 |
| Stalk outer shell | 321 |
| First grasp point | 322 |
| Second grasp | 323 |
| Stalk cut point | 324 |
| Stalk piece | 326 |
| Stalk node | 330 |
| Stalk roll | 400 |
| Nose cone | 410 |
| Flighting | 412 |
| Recess | 420 |
| Main cylinder | 430 |
| Full flute | 440 |
| Flute edge | 442 |
| Leading surface | 444 |
| Trailing surface | 445 |
| Leading wall | 446 |
| Trailing wall | 447 |
| Beveled edge | 448 |
| Flute base | 449 |
| Reduced flute | 450 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. "Stalk roll" 15, 16, 190, 192, 400 is not limited to any specific embodiment or feature disclosed herein, but is meant to include any present art stalk roll that is configured with one or more inventive feature as disclosed and claimed herein.

1. First Embodiment of Stalk Rolls with a Stalk Engagement Gap

Referring now to the drawings, wherein like reference numerals designate identical or corresponding parts throughout the several views, the general operation of corn heads having stalk rolls mounted thereon of the type illustrated in FIGS. 6-9 is similar to the operation of corn heads using stalk rolls 12 of the prior art (as illustrated in FIGS. 1-5). As used herein, "left" and "right" are defined from the perspective of a corn plant with respect to a harvesting machine.

Figure 11:
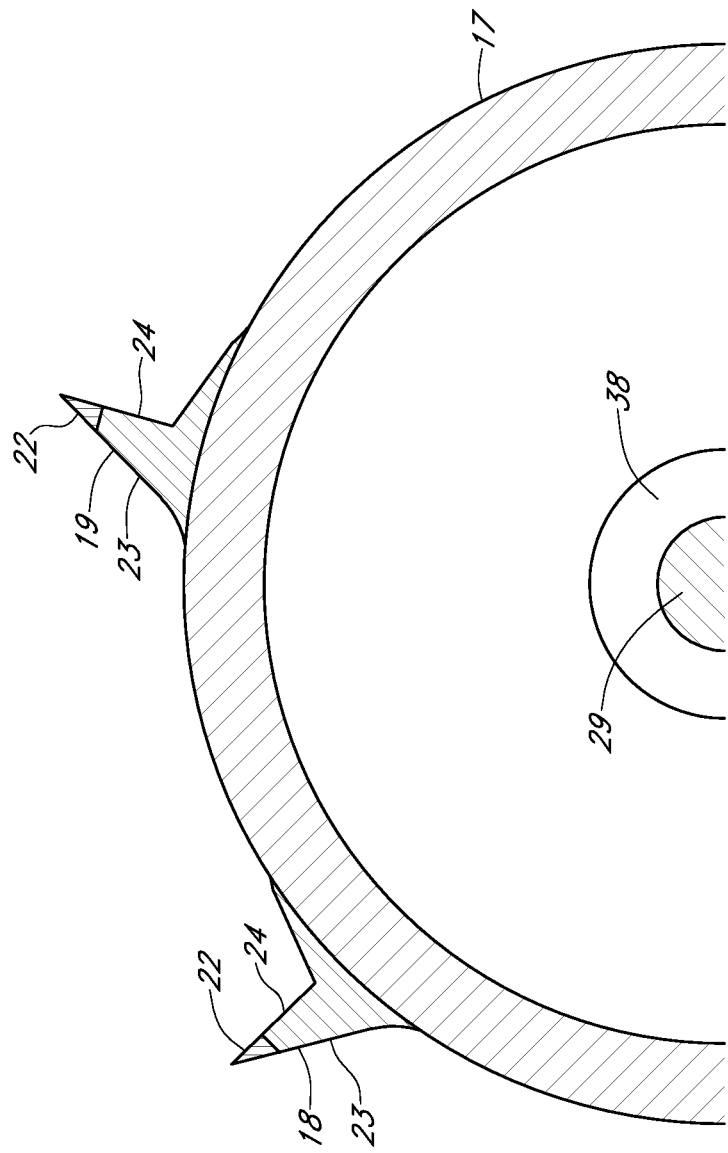
FIG. 11 is an end view of an opposing pair of one embodiment of the present art stalk rolls illustrating flutes with knife edges.

The power source for this corn head row unit is provided from a stalk roll drive shaft 29 through a gearbox, as described in the prior art and is well known to those skilled in the art and not pictured herein. Each corn head row unit on a corn header is provided with a first and second stalk roll 15, 16 arranged parallel to one another to make an opposing pair. The first and second stalk rolls 15, 16 are provided with nose cones 5 having transport vanes 6. Immediately behind the nose cones 5 are cylindrical shells 17 having a first, second, third, and fourth flute 18, 19, 20 and 21, respectively, mounted along the length of the first and second stalk rolls 15, 16 (as can easily be seen in FIG. 6). Each flute 18, 19, 20, 21 may further be provided with a knife edge 22, as is shown in detail in the embodiment depicted in FIG. 11. The knife edges 22 are substantially parallel to the central longitudinal axis of the cylindrical shell 17. As shown in the embodiment in FIGS. 6-9, the stalk rolls 15, 16 may be mounted in the cantilevered manner for rotation by their respective stalk roll drive shafts (not shown), thereby eliminating the need for support brackets or nose bearings.

As with corn headers employing stalk rolls 12 of the prior art, the stalk rolls 15, 16 of the present disclosure pull the stalk 320 in a downward motion, causing the ears 13 to contact the stripper plates 3 and separate from the stalk 320. The flutes 18, 19, 20, 21 affixed to the stalk rolls 15, 16 may also act to lacerate or crush the stalk 320, and also facilitate ejection of the stalk 320 from the corn plant engagement chamber. Gathering chain paddles 1 affixed to gathering chains 2 transport the loose ears 13 to the cross auger trough 8. The cross auger 9 moves the ears 13 from the cross auger trough 8 to the feeder house 11, which moves the ears 13 into the remainder of the harvesting machine for further processing, all of which is well known to those skilled in the art.

Figure 8:
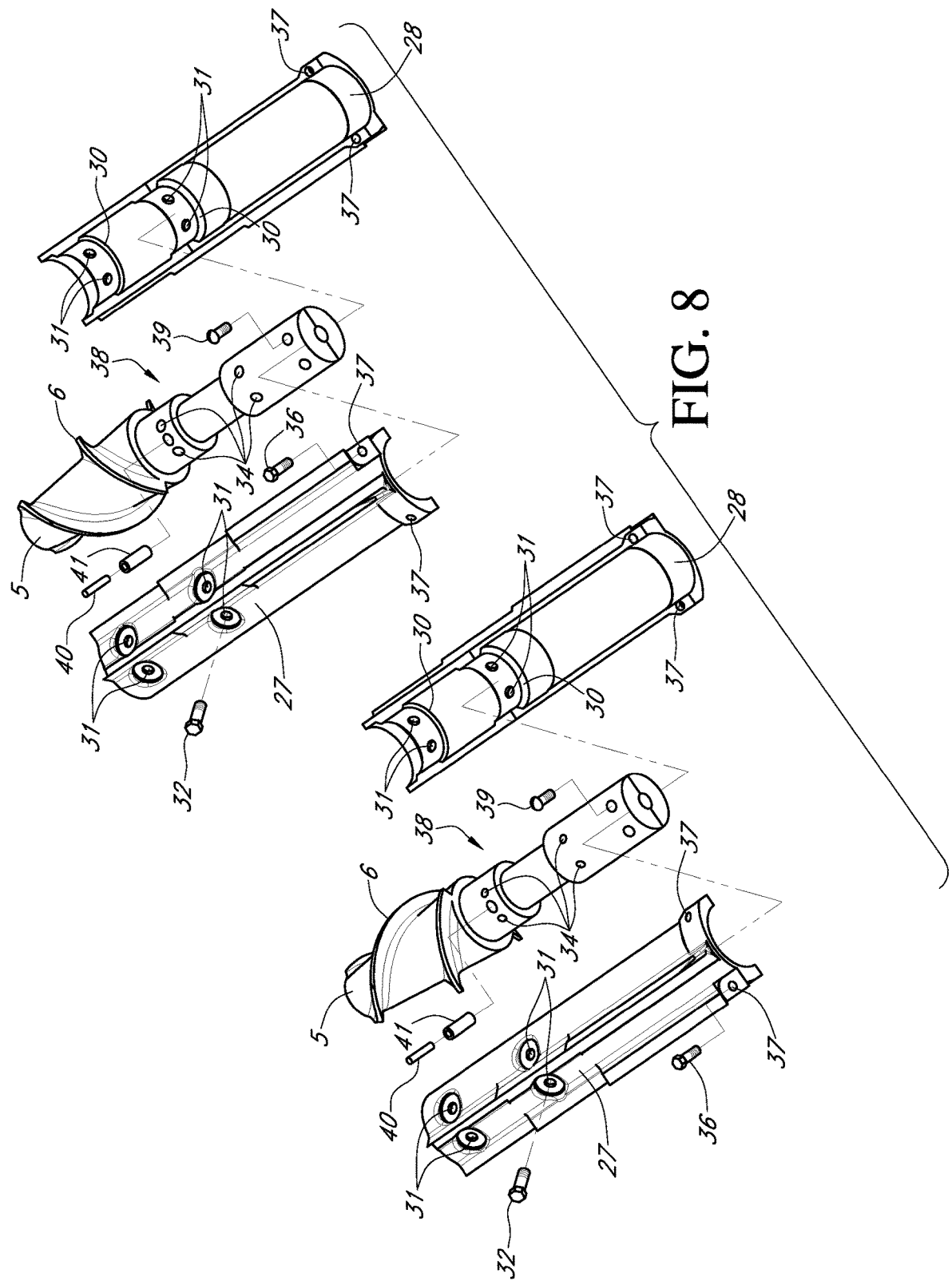
FIG. 8 is an exploded view of a pair of stalk rolls shown in FIGS. 6 & 7.

In an embodiment not pictured herein, the stalk rolls 15, 16 may be manufactured as one piece adapted for engagement upon the stalk roll drive shaft 29. In another embodiment, the first and second stalk rolls 15, 16 may be built as two continuous, integral, semi-cylindrical shells to be bolted to a stalk roll mounting base (not shown) into which the stalk roll drive shaft 29 is inserted, as is best illustrated in FIG. 8. The cylindrical shell 17 may be comprised of two semi-cylindrical shell pieces, an upper semi-cylindrical shell 27 and a lower semi-cylindrical shell 28, that are bolted to the intermediate drive shaft 38. The long bolt holes 37 and long bolts 36 with nuts or other securing members, along with the short bolt holes 31, short bolts 32, and bolt receivers 34, form a structure for mounting the cylindrical shell 17 to the intermediate drive shaft 38, which then may be mounted to the stalk roll drive shaft 29.

FIG. 8 best illustrates the mounting structure for an embodiment employing semi-cylindrical shells 27, 28. In one embodiment, each semi-cylindrical shell 27, 28 is fashioned with two inwardly extending annular ridges 30 having short bolt holes 31. Short bolts 32 pass through the short bolt holes 31 and engage bolt receivers 34 located on an intermediate drive shaft 38. Long bolts 36 pass through the long bolt holes 37 of two corresponding upper and lower semi-cylindrical shells 27, 28, and with a nut or other securing member clamp the semi-cylindrical shells 27, 28 together around the intermediate drive shaft 38. The intermediate drive shaft 38 is clamped to the stalk roll drive shaft 29 by drive shaft bolts 39. In addition, a small pin 40 and a large pin 41 prevent relative rotation between the intermediate drive shaft 38 and the stalk roll drive shaft (not shown in FIG. 8).

Each semi-cylindrical shell 27, 28 may be manufactured having at least two integral flutes. In one embodiment, the flutes are then machined to define the knife edge 22. Each knife edge 22 has a leading surface 23 and a trailing surface 24 that form an acute angle between them of approximately forty degrees, as shown in the embodiment pictured in FIG. 11. The leading surface is a rearward (with respect to the direction of rotation of one of the stalk rolls 15, 16 of an opposing pair) sloping surface, sloping approximately ten degrees from a line passing through the central longitudinal axis of the cylindrical shell 17 and the vertex of the knife edge 22. The trailing surface 24 is a forward (with respect to the direction of rotation of one of the stalk rolls 15, 16 of an opposing pair) sloping surface, sloping approximately thirty degrees from a line passing through the central longitudinal axis of the cylindrical shell 17 and the vertex of the knife edge 22. Other slopes and angles of the leading surface 23 and the trailing surface 24 may be used without departing from the spirit or scope of the stalk roll 15, 16. As is well known to those skilled in the art, tungsten carbide may be applied to the trailing surfaces 24 to make the knife edges 22 self-sharpening. Although not shown, the layer of tungsten carbide is generally between three and twenty thousandths of an inch thick and is induction hardened.

As illustrated in FIGS. 6-9, the flutes 18, 19, 20, 21 of the opposing first and second stalk rolls 15, 16 are offset to one another but not interleaved. As those of ordinary skill in the art will appreciate, though not pictured, the stalk roll design disclosed herein may also be implemented with a rounded flute edge or edge that does not have knife-like characteristics. Accordingly, the scope of the stalk roll 15, 16 is not limited by type of edge fashioned on the flute or the specific cross-sectional shape of the flute.

The present art alleviates the impediment to flow of stalks 320 into the corn plant engagement chamber (which impediment is a result of the egg-beater effect, as described above) by creating at least one stalk engagement gap 25 in the stalk slot 7 per revolution of the stalk roll 15, 16, which is explained in detail below. When the stalk engagement gap 25 is present, corn plant entry into the corn plant engagement chamber is not restricted.

Figure 9A:
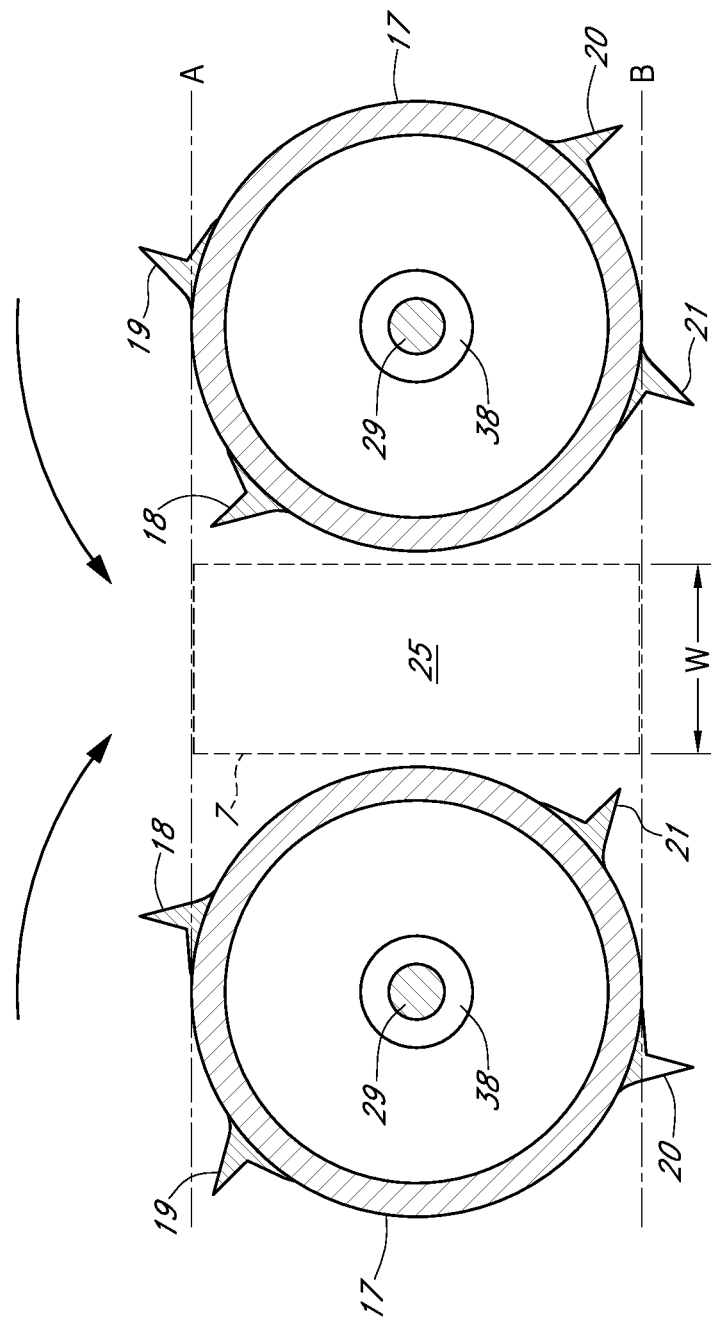
FIG. 9A is an end view of an opposing pair of one embodiment of the present art stalk rolls positioned to illustrate a first moment during which the stalk engagement gap is present.
Figure 9B:
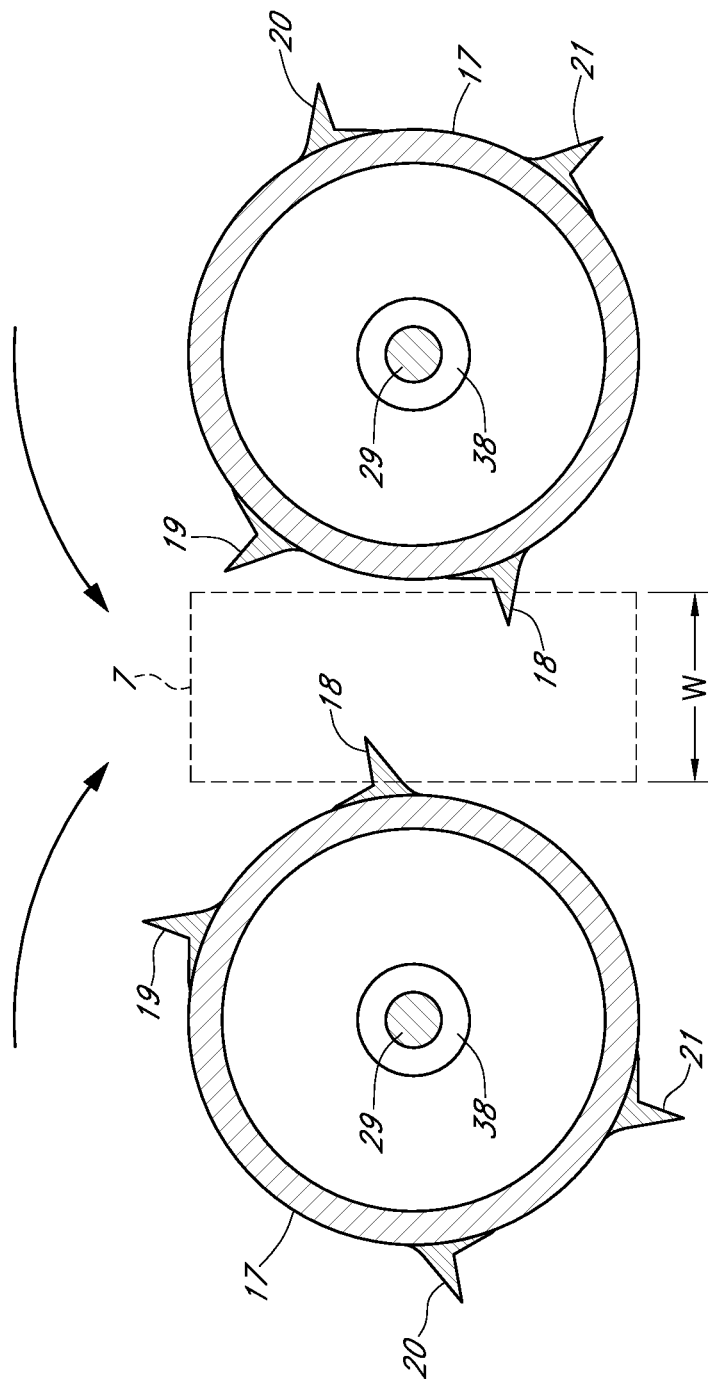
FIG. 9B is an end view of an opposing pair of one embodiment of the present art stalk rolls at a moment in time later than that depicted in FIG. 9A showing the stalk rolls rotated so that the stalk engagement gap is no longer present due to the first opposing flutes positioned in the stalk slot.
Figure 9C:
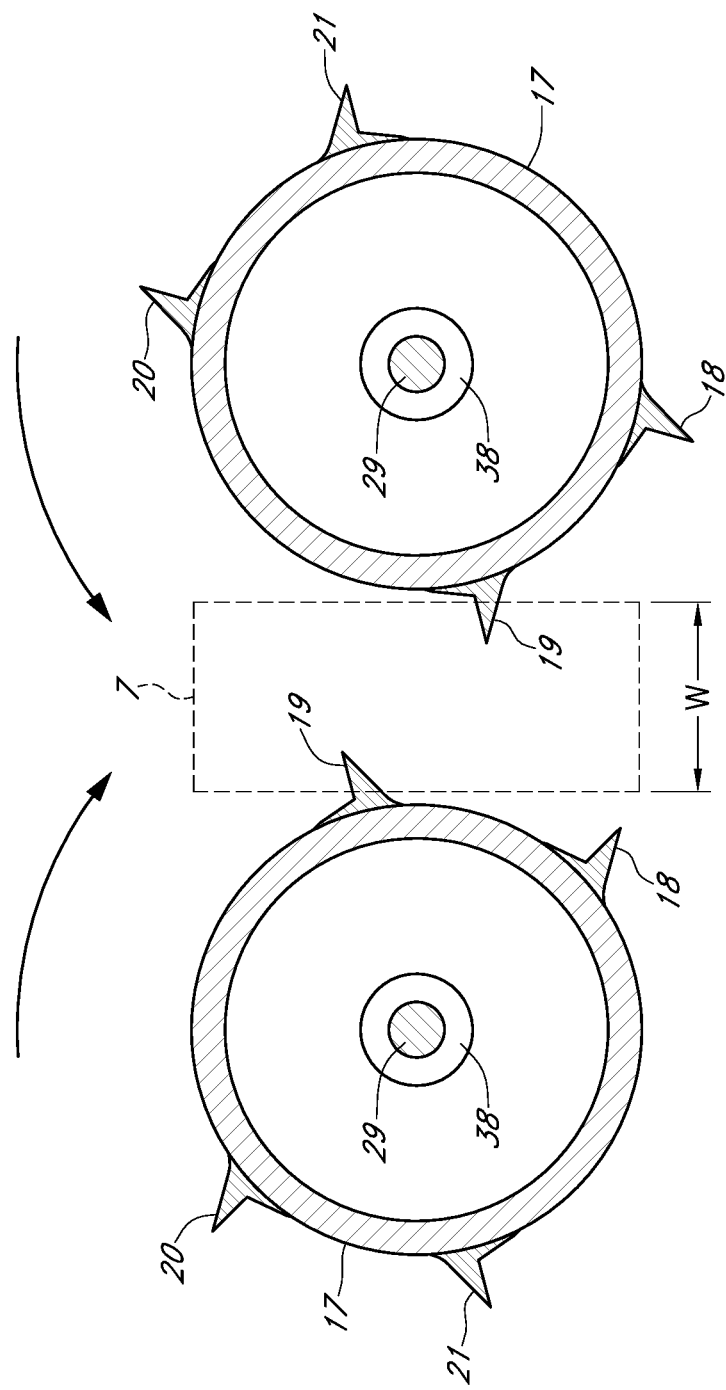
FIG. 9C provides an end view an opposing pair of one embodiment of the present art stalk rolls at a moment in time later than that depicted in FIG. 9B showing the stalk rolls rotated so that the stalk engagement gap is not present due to the second opposing flutes positioned in the stalk slot.
Figure 9D:
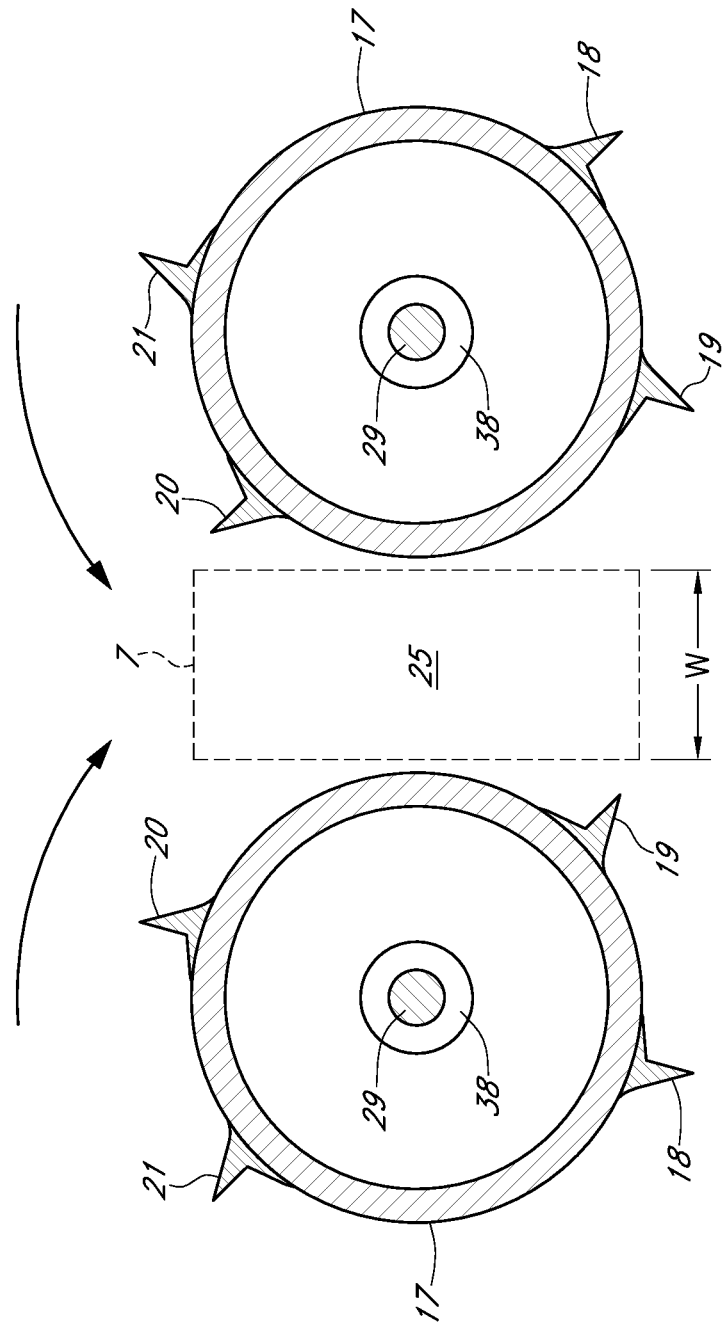
FIG. 9D is an end view of an opposing pair of one embodiment of the present art stalk rolls at a moment in time later than that depicted in FIG. 9C showing the stalk rolls rotated to a position where the stalk engagement gap is present for the second time during one revolution of the stalk rolls.
Figure 9E:
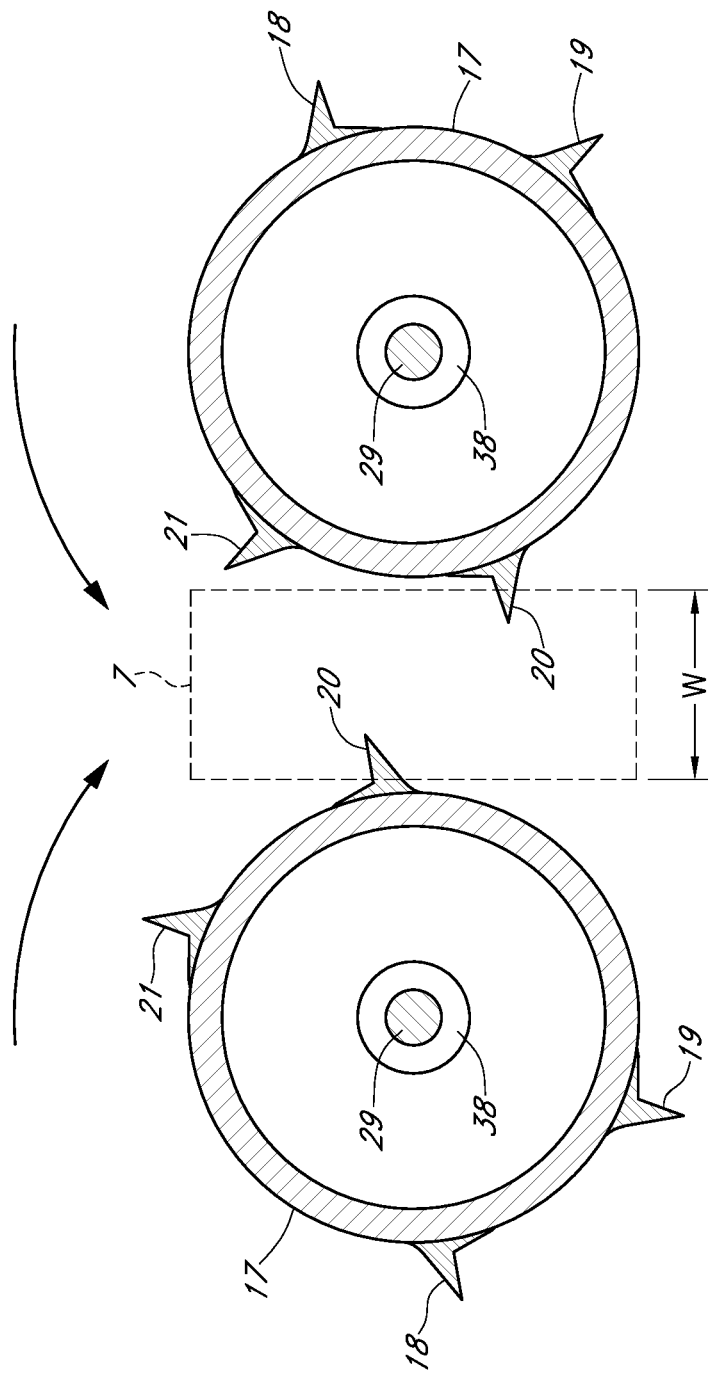
FIG. 9E is an end view of an opposing pair of one embodiment of the present art stalk rolls at a moment in time later than that depicted in FIG. 9D showing the stalk rolls rotated so that the stalk engagement gap is no longer present due to the third opposing flutes positioned in the stalk slot.
Figure 9F:
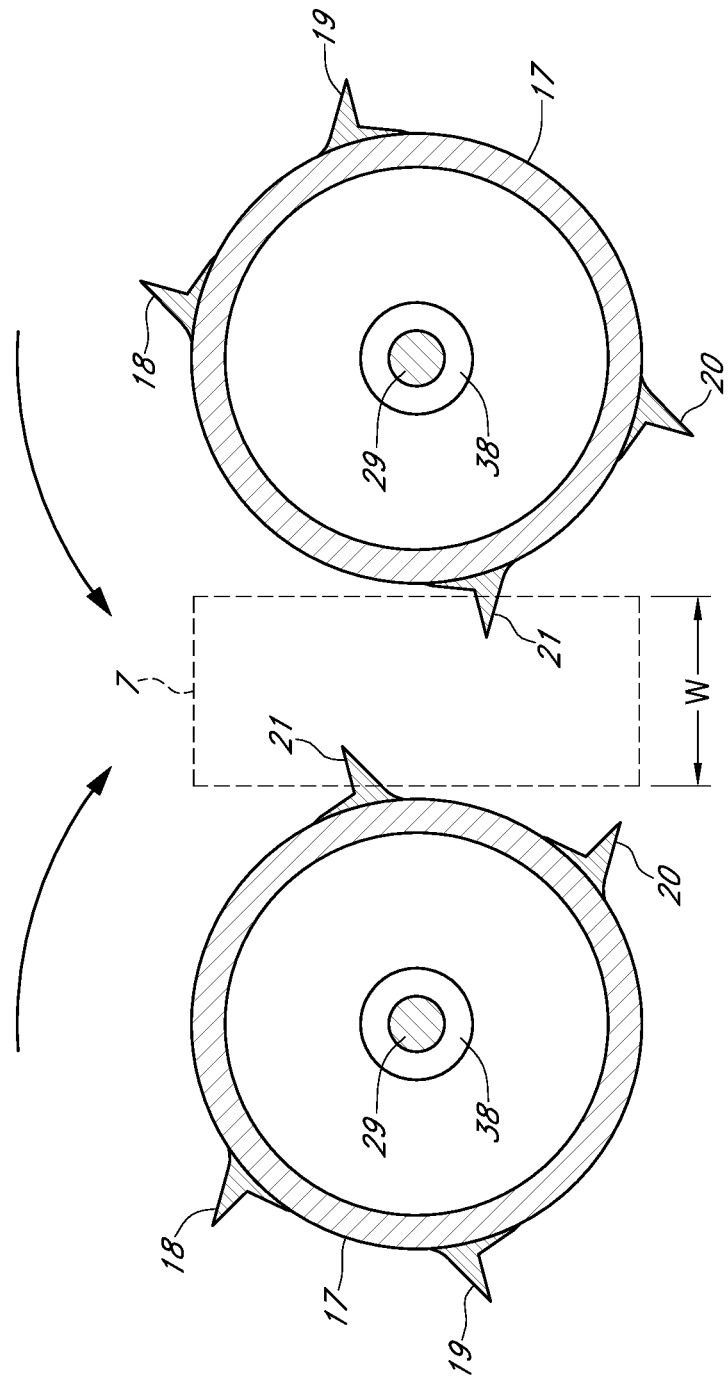
FIG. 9F is an end view of an opposing pair of one embodiment of the present art stalk rolls at a moment in time later than that depicted in FIG. 9E showing the stalk rolls rotated so that the stalk engagement gap is not present due to the fourth opposing flutes positioned in the stalk slot.
Figure 10:
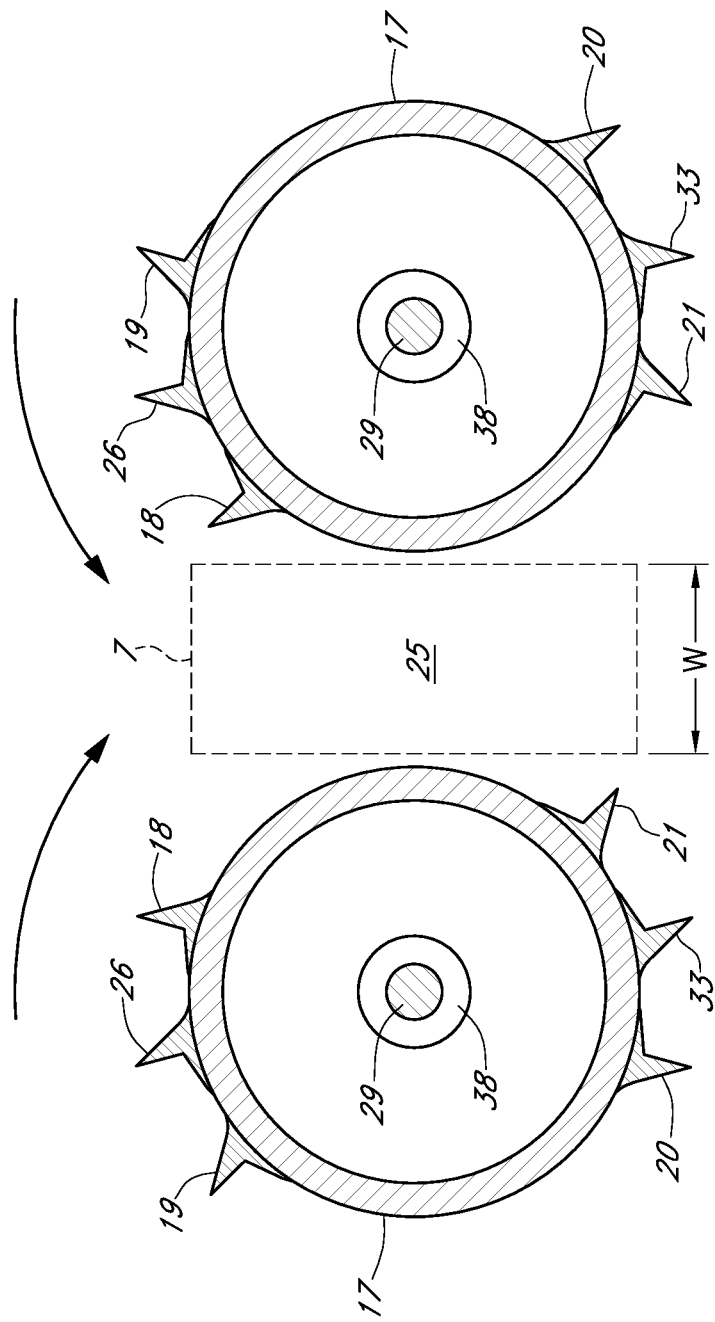
FIG. 10 is an end view of a second embodiment of an opposing pair of the present art stalk rolls having fifth and sixth flutes with a rotational position corresponding to the position of the stalk rolls in FIG. 9A.

As may be seen for the embodiment in FIGS. 9A-9F, the width of the stalk slot 7 is defined as the distance between the inner periphery of the cylindrical shells 17 of the opposing stalk rolls 15, 16, which width is denoted "W" in FIGS. 9A-10. Other embodiments described in detail below include an recess 420, which may affect the width of the stalk slot 7. The height of the stalk slot 7 is essentially infinite, though in practicality the ground surface provides a lower limit. The stalk engagement gap 25, as shown in FIGS. 9A, 9D, and 10, is then defined as the moment(s) during revolution of the first and second stalk rolls 15, 16 in which none of the flutes 18, 19, 20, 21 of the first or second stalk roll 15, 16 are positioned within the stalk slot 7. FIGS. 9B, 9C, 9E, and 9F illustrate the stalk slot 7 after the stalk engagement gap 25 is closed.

FIGS. 9A-9F provide six views of the stalk slot 7 at six different moments during one revolution of the stalk rolls 15, 16, with the direction of rotation of the stalk rolls 15, 16 indicated by the respective arrows. As will be explained in detail below, the embodiment shown in FIGS. 9A-9F is configured so that the stalk engagement gap 25 is present at two different moments in time during one revolution of the stalk rolls 15, 16; and as will be apparent to those skilled in the art, this is but one of many embodiments the stalk rolls 15, 16 may take. Throughout one revolution of the stalk rolls 15, 16, at any point in time, the flutes 18, 19, 20, 21 may be engaged in five different modes of action upon a stalk 320 at any point along the axial length of the flute 18, 19, 20, 21 (depending on the location and orientation of the flutes 18, 19, 20, 21 and the particular embodiment). The five modes of action upon the stalk 320 are: (1) unrestricted entry of the stalk 320 into the corn plant engagement chamber (which occurs at the moment in time shown in FIGS. 9A and 9D, although restricted entry may occur at other moments in time); (2) flute 18, 19, 20, 21 or knife engagement with the stalk 320 (which may occur at moments in time shown in FIGS. 9B, 9C, 9E, and 9F, but may also occur at other moments in time); (3) lacerating and crushing of the stalk 320 by the flutes 18, 19, 20, 21 or knives (which may occur at the moments in time shown in FIGS. 9B, 9C, 9E, and 9F, but may also occur at other moments in time); (4) ear separation and stalk 320 ejection (which may occur at moments in time shown in FIGS. 9B, 9C, 9E, and 9F, but may also occur at other moments in time); (5) stalk 320 release by the stalk rolls 15, 16 for lateral travel of the stalk 320 (which most often occurs at moments in time shown in FIGS. 9A and 9D, but may also occur at other moments in time).

FIG. 9A shows the stalk engagement gap 25, and illustrates that when the stalk engagement gap 25 appears, no flutes 18, 19, 20, 21 are located in the stalk slot 7. When the stalk rolls 15, 16 are in this position a stalk 320 (not shown) may freely enter the stalk slot 7 and the corn plant engagement chamber with no restriction. The stalk engagement gap 25 also allows stalks 320 already positioned between the stalk rolls 15, 16 to travel in a lateral direction to compensate for the forward motion of the harvesting machine to which the corn head is attached.

FIG. 9B shows the stalk slot 7 at a later moment in time after the stalk rolls 15, 16 have rotated from their positions shown in FIG. 9A. FIG. 9B shows that at this point, the first flute 18 of each stalk roll 15, 16 has moved into the stalk slot 7 so that there is no stalk engagement gap 25, and the first flutes 18 of the respective stalk rolls 15, 16 now engage any stalk 320 between the stalk rolls 15, 16. This engagement may serve to lacerate or crush the stalk 320, or to pull the stalk 320 downward through the corn plant engagement chamber and subsequently eject the stalk 320 depending on the specific embodiment.

FIG. 9C shows the stalk slot 7 at still a later moment in time wherein the second flute 19 of each stalk roll 15, 16 has moved into the stalk slot 7 so that there is still no stalk engagement gap 25. The second flutes 19 of each respective stalk roll 15, 16 now engage any stalk 320 between the stalk rolls 15, 16. This engagement may serve to lacerate or crush the stalk 320, or to pull the stalk 320 downward through the corn plant engagement chamber and subsequently eject the stalk 320 depending on the specific embodiment.

FIG. 9D provides a snapshot of the stalk slot 7 at a moment in time later than the moment depicted in FIG. 9C, and shows the stalk engagement gap 25 present for the second time during this revolution of the stalk rolls 15, 16. The stalk engagement gap 25 is present since no flutes 18, 19, 20, 21 are positioned within the stalk slot 7 when the stalk rolls 15, 16 are positioned as in FIG. 9D, and a stalk 320 (not shown) may again freely enter the stalk slot 7 and the corn plant engagement chamber with no restriction. Again, the stalk engagement gap 25 also allows stalks 320 already positioned between the stalk rolls 15, 16 to travel in a lateral direction to compensate for the forward motion of the harvesting machine to which the corn head is attached.

FIG. 9E shows the stalk slot 7 at a later moment in time from the moment shown in FIG. 9D wherein the third flute 20 of each stalk roll 15, 16 has moved into the stalk slot 7 so that there is no stalk engagement gap 25. At this point, the third flutes 20 of the respective stalk rolls 15, 16 now engage any stalk 320 between the stalk rolls 15, 16. As with similar moments in time already explained, this engagement may serve to lacerate or crush the stalk 320, or to pull the stalk 320 downward through the corn plant engagement chamber and subsequently eject the stalk 320 depending on the specific embodiment.

FIG. 9F shows the stalk slot 7 at still a later moment in time wherein the fourth flute 21 of each stalk roll 15, 16 have moved into the stalk slot 7 so that there is still no stalk engagement gap 25. Here, the fourth flutes 21 of the respective stalk rolls 15, 16 engage any stalk 320 between the stalk rolls 15, 16. Again, this engagement may serve to lacerate or crush the stalk 320, or to pull the stalk 320 downward through the corn plant engagement chamber and subsequently eject the stalk 320 depending on the specific embodiment. As will be apparent to those skilled in the art, the next snapshot in time of the stalk slot 7 according to the pattern indicated by FIGS. 9A-9F will be identical to FIG. 9A, and would provide the last view of one full revolution of the stalk rolls 15, 16.

FIGS. 6-9 show an illustrative embodiment wherein the stalk rolls 15, 16 and their respective flutes 18, 19, 20, 21 are configured so that two stalk engagement gaps 25 appear per revolution of the stalk rolls 15, 16. As those of ordinary skill in the art will appreciate, the stalk rolls 15, 16 and their respective flutes 18, 19, 20, 21 may be configured so that nearly any number of stalk engagement gaps 25 appear per revolution of the stalk rolls 15, 16. For example, although not shown in the figures herein, one of ordinary skill in the art could easily add a fifth flute to the stalk rolls 15, 16 between the fourth and first flutes 18, 21 on each stalk roll 15, 16; and thereby reduce the number of stalk engagement gaps 25 per revolution of the stalk rolls 15, 16 from two to one.

In the illustrative embodiment shown in FIGS. 6-9, two structural features are necessary to create two stalk engagement gaps 25 per revolution of the stalk rolls 15, 16. First, the flutes 18, 19, 20, 21 of each stalk roll 15, 16 must be positioned around the circumference of the stalk roll 15, 16 in a non-equidistant manner. That is, the circumferential distance between the first flute 18 and fourth flute 21 is greater than the circumferential distance between the third flute 20 and fourth flute 21 on each stalk roll 15, 16. Likewise, the circumferential distance between the second flute 19 and third flute 20 is greater than the circumferential distance between the first flute 18 and second flute 19 of each stalk roll 15, 16. However, this may be achieved using flutes 18, 19, 20, 21 of different lengths so as to vary the circumferential distance between terminal ends of flutes 18, 19, 20, 21. Second, the first stalk roll 15 of an opposing pair is positioned on its respective stalk roll drive shaft 29 so that it is slightly advanced (with respect to rotational positions of the flutes 18, 19, 20, 21) compared to the second stalk roll 16 of the pair. During operation, the stalk rolls 15, 16 operate at the same rotational speed so that the difference in positioning is maintained throughout operation. Because the stalk rolls 12 of the prior art and the flutes thereon are not configured to yield any stalk engagement gaps 25, they essentially create a wall of rotating steel as previously described, which restricts the entry of the stalk 320 into stalk slot 7 and the corn plant engagement chamber.

FIG. 10 provides an end view of another embodiment of stalk rolls 15, 16. In this embodiment, a fifth flute 26 is added between the first flute 18 and second flute 19 so that the distance between the first flute 18 and the fifth flute 26 is equal to the distance between the second flute 19 and the fifth flute 26. A sixth flute 33 has also been added between the third flute 20 and the fourth flute 21 so that the distance between the third flute 20 and the sixth flute 33 is equal to the distance between the fourth flute 21 and the sixth flute 33. FIG. 10 depicts a moment when the stalk engagement gap 25 is present, thereby allowing stalks 320 to enter the corn plant engagement chamber. In this embodiment, as in the embodiment shown in FIGS. 9A-9F, the stalk engagement gap 25 appears twice per revolution of the stalk rolls 15, 16.

Figure 6:
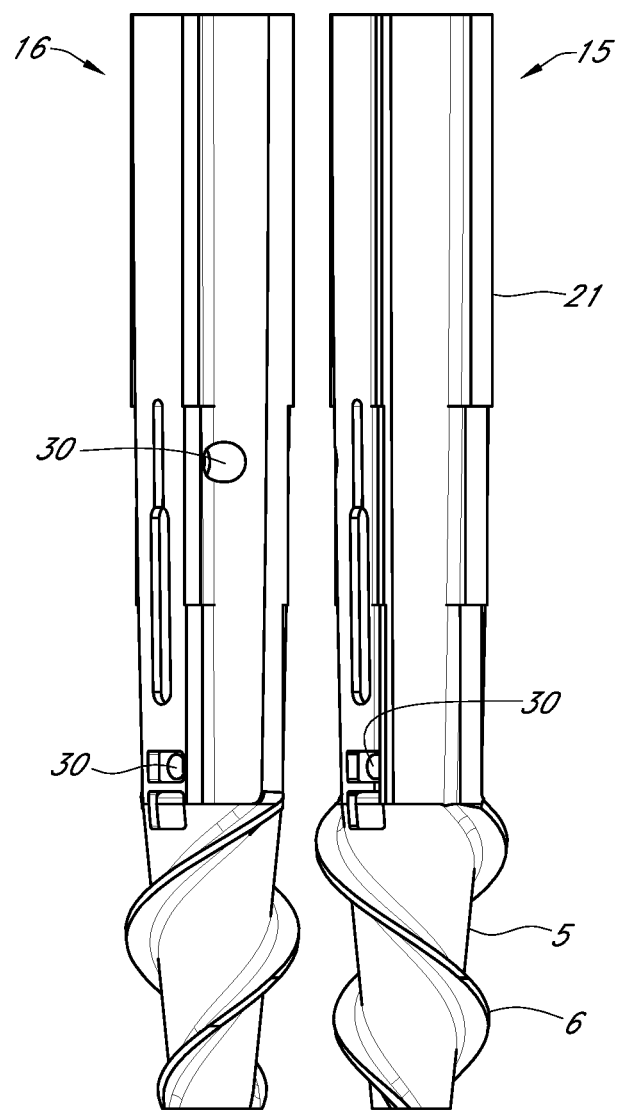
FIG. 6 is a top view of a pair of opposing stalk rolls incorporating certain aspects of the present disclosure.
Figure 7:
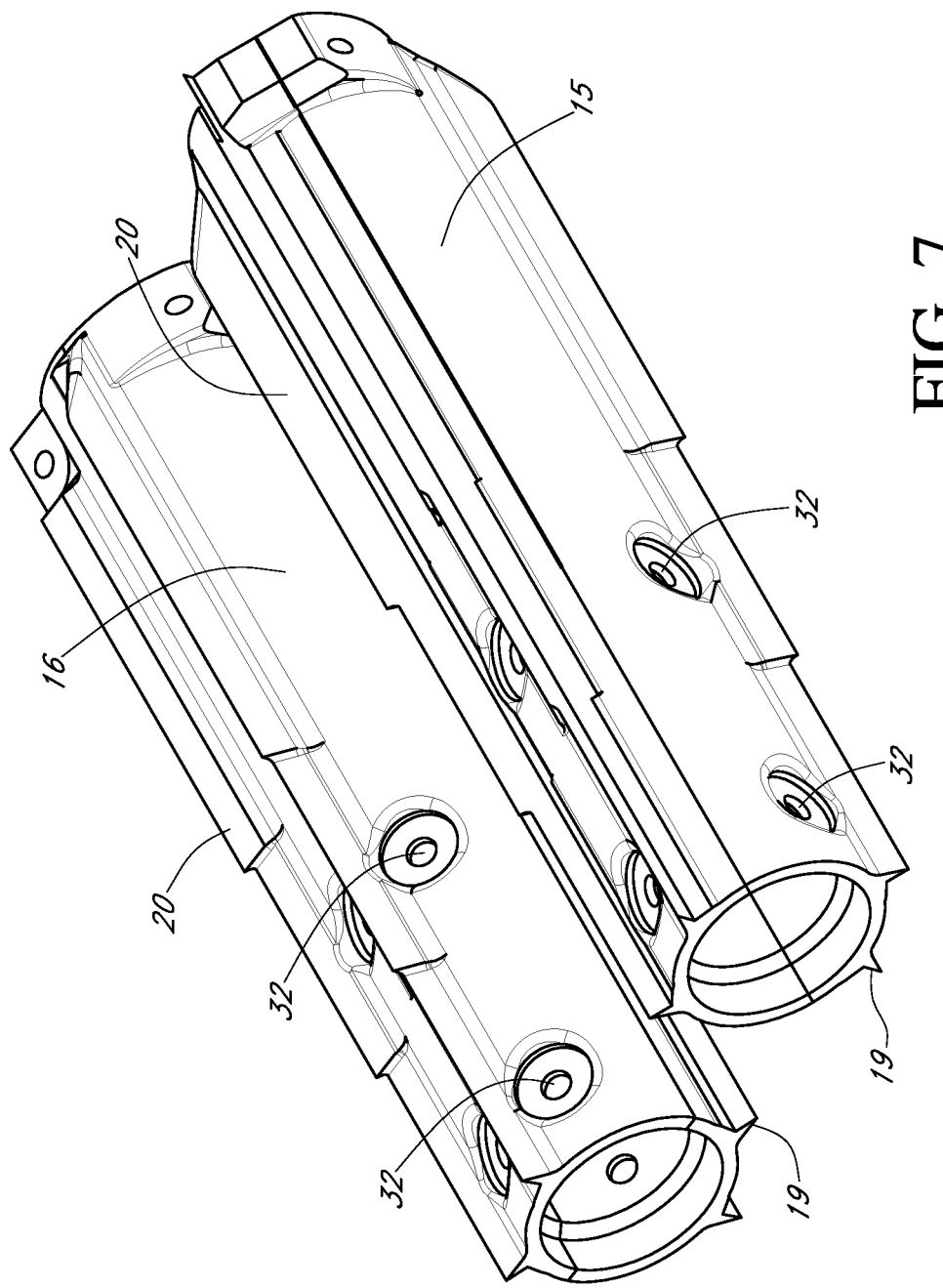
FIG. 7 is a perspective view of a pair opposing of stalk rolls incorporating certain aspects of the present disclosure, wherein the nose cones have been removed for clarity.

In an alternative embodiment not shown herein, additional flutes that have a smaller axial length as compared to the axial length of flutes 18, 19, 20, 21 could be placed between all or some of flutes 18, 19, 20, 21. (Alternatively some of the original flutes 18, 19, 20, 21 could be fashioned with a smaller axial length than the axial length of adjacent flutes 18, 19, 20, 31.) Here, the additional flutes would not extend the entire distance of the cylindrical shell 17. Instead, the additional flutes would only extend along the cylindrical shell 17 from a point proximal to the end of the cylindrical shell 17 closest to the cross auger 9 (which may be the same point from which the flutes 18, 19, 20, 21 extend, as shown in FIG. 6) to a point distal from the cross auger 9, but not the entire length of the cylindrical shell 7 up to the interface between the cylindrical shell 17 and the nose cone 5. That is, the additional flutes would not extend radially from the cylindrical shell 17 on a portion of the cylindrical shell 17 that is distal from the cross auger 9 (and also distal to the connection between the stalk roll drive shaft 29 and the corn header). This embodiment facilitates stalk rolls 15, 16 that are configured so as to provide a stock engagement gap 25 along a predetermined axial portion of the stalk rolls 15, 16 that first engage the stalk 320 (i.e., a portion distal from the cross auger 9) while still providing more flutes to engage the stalk 320 in the corn plant engagement chamber on a portion of the stalk rolls 15, 16 proximal to the corn header (which may assist in decomposition of the stalk 320 and harvesting speed).

As is apparent from the embodiment shown in FIG. 10, the specific number and orientation of flutes 18, 19, 20, 21, 26, 33 employed on a stalk roll 15, 16 may vary. Therefore, the precise number of flutes 18, 19, 20, 21, 26, 33 employed in a particular embodiment, or the specific orientation thereof in no way limits the scope of the present stalk roll 15, 16. As long as the flutes 18, 19, 20, 21, 26, 33 are oriented upon the stalk rolls 15, 16 and the stalk rolls 15, 16 are orientated with respect to each other such that at least one stalk engagement gap 25 appears during one revolution of the stalk rolls 15, 16, the specific orientation or number of flutes 18, 19, 20, 21, 26, 33 are not limiting to the scope of the present stalk roll 15, 16. Furthermore, what is referred to herein as a cylindrical shell 17 of the stalk rolls 15, 16 need not be fashioned as a perfect cylinder; rather, it may be fashioned so that the cross-sectional area changes along the axial length (e.g., tapered), or be fashioned with any cross-sectional shape that performs in a relatively satisfactory manner.

2. Other Embodiments of Stalk Rolls with a Stalk Engagement Gap

Figures 12, 13:
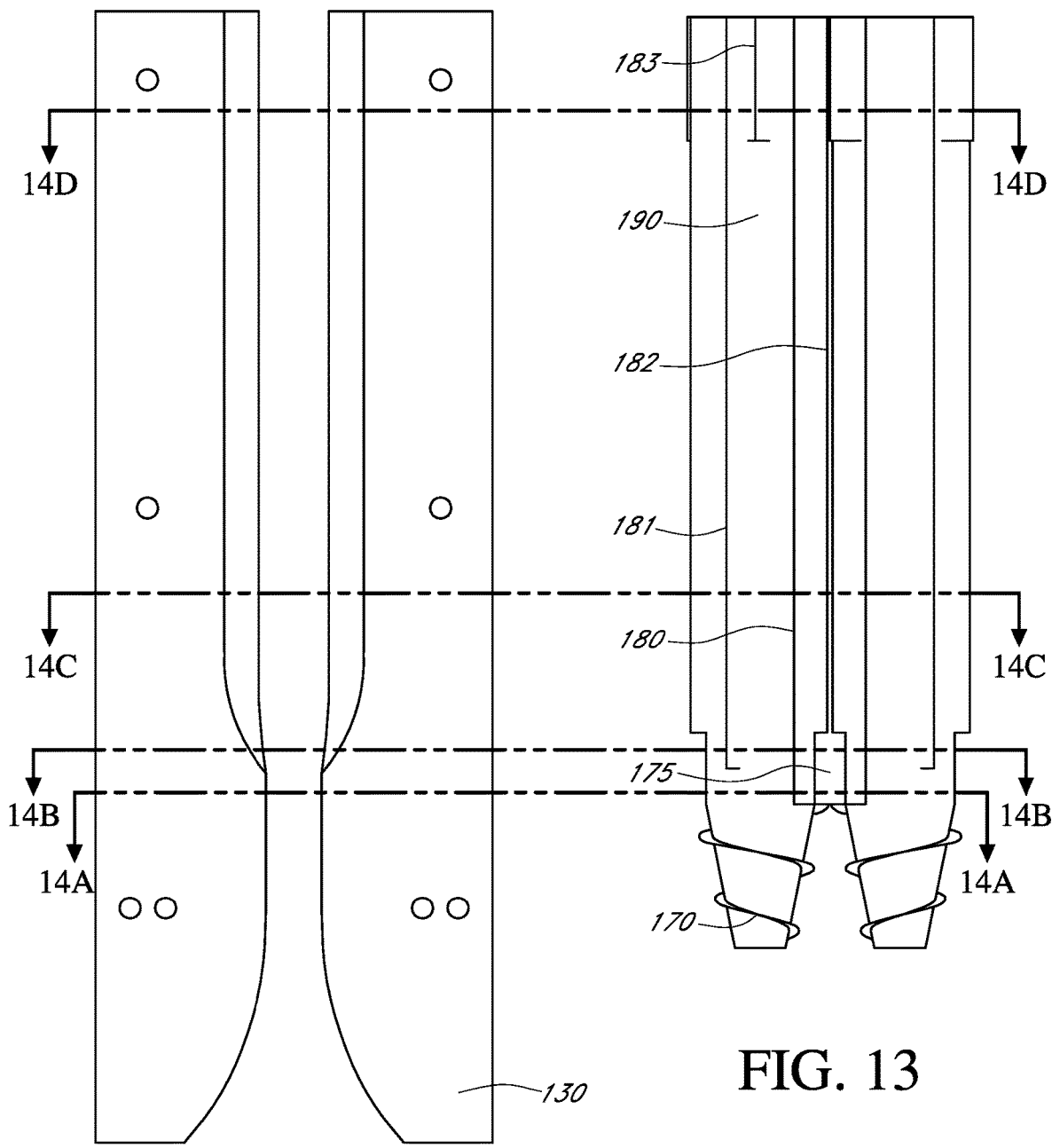
FIG. 12 is a top view of one embodiment of a pair of stripper plates that may be used with various embodiments of the present art stalk roll showing various zones along the length of the stripper plates.
FIG. 13 is a top view of one embodiment of a pair of stalk rolls according to the present disclosure showing various zones along the length of the stalk rolls.
Figure 14A:
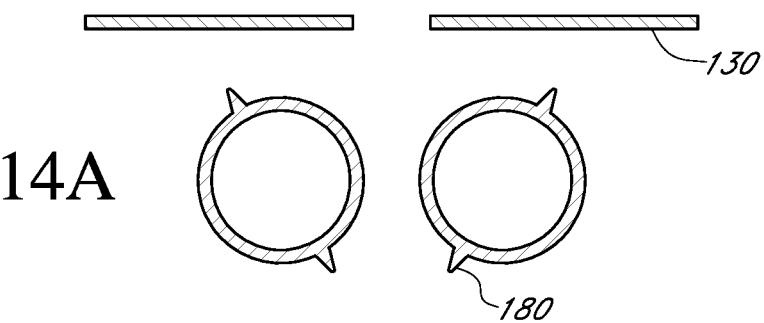
FIG. 14A is a cross-sectional view of the stripper plates and stalk rolls from FIGS. 12 & 13, respectively, at line 14A.

Another embodiment of a pair of stalk rolls 190 implementing a stalk engagement gap 25 is shown in FIGS. 13-14E. A pair of beveled stripper plates 130 is shown in FIG. 12, and lines B-B, C-C, D-D, and E-E represent various zones along the lengths of the stripper plates 130 and stalk rolls 190. The stalk rolls 190 and stripper plates 130 from FIGS. 12 and 13 are shown in cross section at various positions along the lengths thereof in FIGS. 14B-14E. The embodiment of the stalk rolls 190 and stripper plates 130 shown in FIGS. 12-14E are configured to create four distinct (but interrelated and overlapping) zones along the lengths thereof, each of which zone performs a separate function and purpose within the row unit. The combination of zones, relationships, and sub-function are designed to improve the performance of the corn head and harvesting machine by allowing better material flow through the row unit, reducing congestion and MOTE levels through the row unit, conveying systems, and the harvesting machine; thereby improving harvesting machine speeds and efficiencies. The four (4) current interrelated overlapping zones are the Alignment, Entry, Ear Separation, and Post-Ear Separation Plant Ejection Zones.

A. The Alignment Zone

Figure 14B:
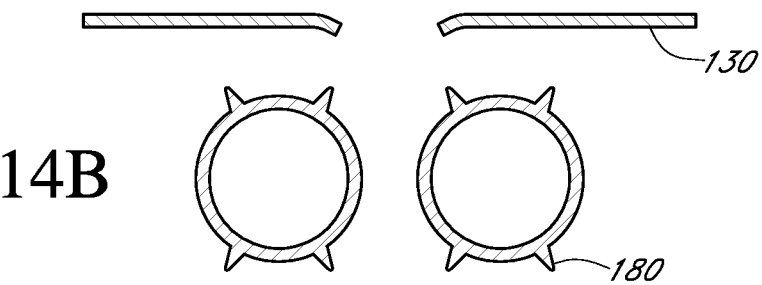
FIG. 14B is a cross-sectional view of the stripper plates and stalk rolls from FIGS. 12 & 13, respectively, at line 14B.
Figure 20:
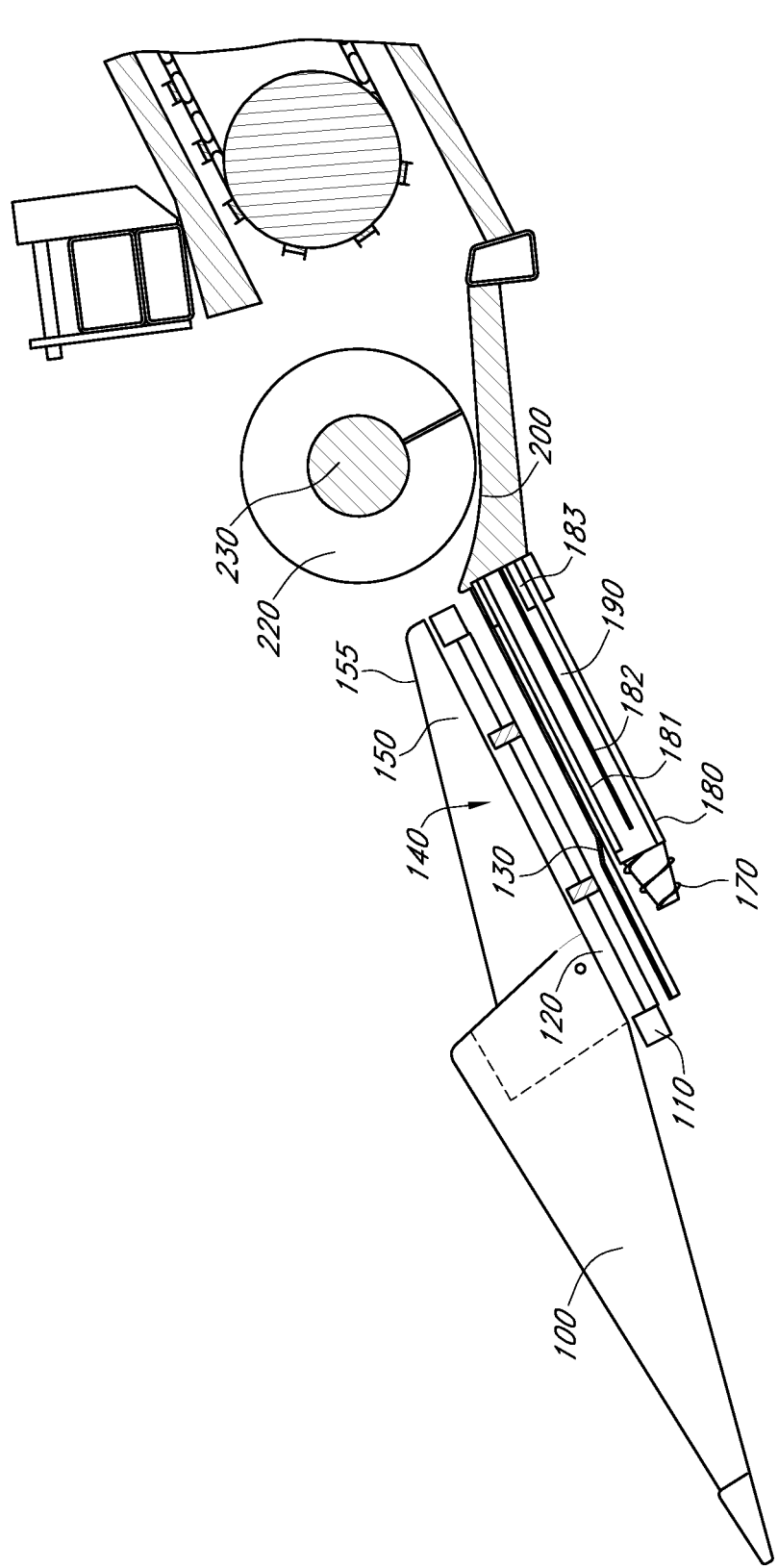
FIG. 20 is a cross-sectional view of one embodiment of a corn head incorporating certain aspects of the present disclosure.

In the embodiment pictured in FIGS. 12-14E, the Alignment Zone is generally about the line B-B toward the front of the stalk rolls 190 and adjacent the nose cones 5, which is best shown in FIGS. 13 and 14B. In some embodiments, the Alignment Zone extends along the stalk rolls 190 from the front of the nose cones 5 to the line B-B. The purposes of this zone are to align, direct, and gather the corn plant for conveyance to the Entry and/or Ear Separation Zone with the ear 300 intact and positioned for recovery with minimal MOTE. In the Alignment Zone of the embodiment of the stripper plate 130 shown in FIGS. 12 and 14B-14E, the stripper plates 130 are substantially flat, as best shown in FIGS. 12 and 14B. This reduces the tendency of ears 300 to wedge below the stripper plates 130. The transport vanes 170 on the nose cones 4 in front of the Alignment Zone serve to guide stalks 320 into the ear separation chamber 140, which is best shown in FIG. 20. The rotating transport vanes 170 may be either timed or non-meshing, so as to provide positive material flow in tough, damp, or high-speed harvesting conditions. One function of the transport vanes 170 generally is to center the stalk 320 in the ear separation chamber 140.

The stalk rolls 190 shown in FIGS. 13-14E also incorporate a stalk slot 7 in which a stalk engagement gap 25 occurs intermittently. The stalk slot 7 and stalk engagement gap 25 as defined for this embodiment of stalk rolls 190 is the same as those defined for the embodiment of stalk rolls 15, 16 shown in FIGS. 9-10. This embodiment of stalk rolls 190 facilitates a stalk engagement gap 25 that occurs along a specific length of the stalk rolls 190. As shown in FIG. 14B, the stalk engagement gap 25 first occurs toward the front of the stalk rolls 190 in the Alignment Zone and extends along the entire length thereof (which length is shown in FIG. 13).

This facilitates simple transport of the stalk 320 from the nose cones 5 to the ear separation chamber 140 between the stalk rolls 190. The stalk engagement gap 25 in the Alignment Zone is formed by placing two short flutes 180 separated by 180 degrees on each stalk roll 190, such that the short flutes 180 are arranged in a knife-to-knife configuration. Another function of the transport vanes 170 is to ensure that the stalk 320 does not fall forward out of the stalk engagement gap 25.

B. The Entry Zone

Figure 14C:
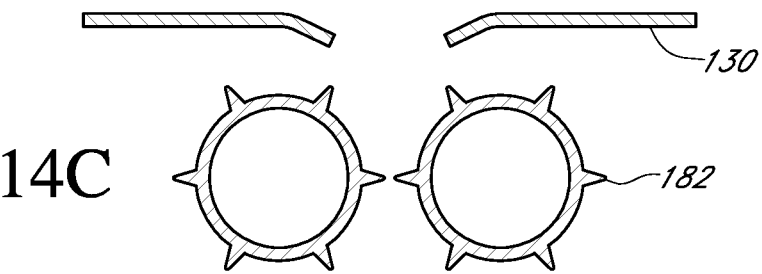
FIG. 14C is a cross-sectional view of the stripper plates and stalk rolls from FIGS. 12 & 13, respectively, at line 14C.

In the embodiment pictured in FIGS. 12-14E, the Entry Zone is generally about the line C-C toward the front of the stalk rolls 190, but behind the Alignment Zone, which is best shown in FIGS. 13 and 14C. In some embodiments, the Entry Zone extends along the stalk rolls 190 from the line C-C to the front portion of the stalk rolls 190 at the terminus of any intermediate flutes 182, which are described in detail below. The primary purpose of this zone is to allow entry of the stalk 320 into the ear separation chamber 140 between the stalk rolls 190. The rate at which stalks 320 are accepted into the row unit is a major factor in determining harvesting speed.

As explained above, prior art teaches that to increase the rate of entry, the rotating speed of the stalk roll 12 must be increased, which merely increases the egg-beater effect. If the stalk 320 is not pinched in the Entry Zone, the stalk 320 stalls in the row unit, which stalling allows the rotating flute edges to sever the stalk 320. This stall also causes the stalk 320 to lean away from the row unit. Consequently, ear separation often occurs near the opening of the row unit, such that loose ears 300 fall to the ground and become irretrievable.

A stalk engagement gap 25 is also present in the Entry Zone in this embodiment of the stalk rolls 190, which is best shown in FIG. 14C. The short flutes 180 in the Alignment Zone extend into the Entry Zone, and the stalk engagement gap 25 in the Entry Zone is formed by placing two additional short flutes 180 adjacent to the short flutes 180 from the Alignment Zone. As shown in FIG. 14C, the four short flutes 180 are not equally spaced about the periphery of the stalk rolls 190, but instead are positioned in groups of two. This facilitates the stalk engagement gap 25 in the Entry Zone since adjacent short flutes 180 in each pair are close enough to each other that a stalk engagement gap 25 is present at least once during a full revolution of the stalk rolls 190. In this embodiment a stalk engagement gap 25 is present twice during a full revolution in both the Alignment Zone and Entry Zone, as is evident from FIGS. 14B and 14C.

C. The Ear Separation Zone

Figure 14D:
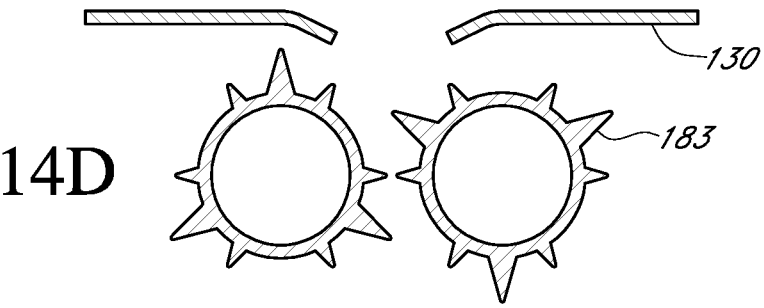
FIG. 14D is a cross-sectional view of the stripper plates and stalk rolls from FIGS. 12 & 13, respectively, at line 14D.

In the embodiment pictured in FIGS. 12-14E, the Ear Separation Zone is generally about the line D-D on the front half of the stalk rolls 190, which is best shown in FIGS. 13 and 14D. In some embodiments, the Ear Separation Zone extends along the stalk rolls 190 from the terminus of an intermediate flute 182 toward the front of the stalk rolls 190 to the terminus of a long flute 183, which is described in detail below. Generally, the Ear Separation Zone extends along a greater length of the stalk rolls 190 than does any other zone. The primary purpose of this zone is to separate the ear 300 from the stalk 320 and prevent any ears 300 from falling forward out of the row unit. In this zone, the embodiment of the stalk rolls 190 shown herein pull the stalk 320 through the stripper plates 130 without prematurely severing the stalk 320. The maximum vertical speed at which the stalk rolls 190 consume the stalk 320 is determined by the damaging occurring to the ear 300 at a given speed, and will vary from one variety of corn to the next.

As best shown in FIGS. 13 and 14D, intermediate flutes 183 that extend radially further from the stalk roll 190 than short flutes 180 may be positioned in the Ear Separation Zone. Because the intermediate flutes 183 are radially longer than the short flutes 180, stalk rolls 190 engage stalks 320 more securely in this zone, which is evident from FIG. 14D. In the embodiment shown in FIGS. 12-14E, like the short flutes 180, the intermediate flutes 182 are not intermeshed but opposed with minimal clearance so that as a flute 180, 182 on one stalk roll 190 begins to engage the stalk 320, the opposing flute 180, 182 on the other stalk roll 190 engages the stalk 320 at a point on the horizontally opposite side of the stalk 320. This balanced engagement action reduces lateral stalk 320 whipping, which whipping can dislodge and toss the ear 300 from the stalk 320, or cause the stalk 320 to prematurely break or sever. The balanced engagement action allows the stalk rolls 190 to evenly pull the stalk 320 down so that the stripper plates 130 may rapidly separate the ear 300 from the stalk 320 in the Ear Separation Zone.

Also apparent from FIG. 14D is the fact that the Ear Separation Zone does not include a stalk engagement gap 25. This is because the intermediate flutes 182 are positioned in the space between the two groups of short flutes 180 present in the Entry Zone. Accordingly, in the pictured embodiment a total of six flutes 180, 182 are present in the Ear Separation Zone, and they are equally spaced about the periphery of the stalk roll 190, such that each flute 180, 182 is separated by sixty degrees. The two short flutes 180 in each pair in the Entry Zone are also separated by sixty degrees, and each pair of short flutes 180 is separated from the other by 120 degrees. A stalk engagement gap 25 is not required in the Ear Separation Zone because at this point the stalk 320 is securely positioned between the two stalk rolls 320 and the danger of the stalk 320 falling forward out of the ear separation chamber 140 has been alleviated. That is, the egg beater effect previously described has been eliminated by providing a stalk engagement gap 25 in the Alignment and Entry Zones.

D. The Post-Ear Separation Plant Ejection Zone

In the embodiment pictured in FIGS. 12-14E, the Post-Ear Separation Plant Ejection Zone is generally about the line E-E toward the back of the stalk rolls 190, which is best shown in FIGS. 13 and 14E. In some embodiments, this zone extends along the stalk rolls 190 from the start of a long flute 183 to the terminus of a long flute 183 toward the back of the stalk roll 190, which is described in detail below. The primary purpose of this zone is to rapidly eject the stalk 320 from the row unit to minimize interference between MOTE and ears 300. No specific speed ratio controls the operating speed of this zone. After ear separation, increasing stalk 320 ejection speed effectively reduces MOTE entering the threshing (kernel separation) area of the harvesting machine, thereby increasing threshing efficiency and capacity.

As shown in FIGS. 13 and 14E, this zone may include a plurality of long flutes 183, three of which are shown on each stalk roll 190. The long flutes 183 extend radially further from the stalk roll 190 than any other flutes 180, 182. Within this zone, the long flutes 183 may be both meshing and non-meshing so as to create a high-speed clean out zone. The stalk rolls 190 may also be aerodynamically designed to create a suction effect so that unattached MOTE from the ear separation chamber 140 is pulled downward and returned to the field. The Post-Ear Separation Plant Ejection Zone may also be configured to sever, crush, chop, or otherwise manipulate the stalk 320 to speed decomposition thereof. The various functions of this zone may be achieved through different orientations and/or configurations of flutes 180, 182, 183 in the zone, as well as the number of flutes 180, 182, 183 therein. Accordingly, the scope of the stalk rolls 190 is not limited by the number of flutes 180, 182, 183 in any zone, nor it is limited by the configuration and/or orientation of flutes 180, 182, 183 in any zone.

As shown in FIGS. 12 and 14E, this zone may be configured as a clean-out zone by adding short lengths of long flutes 183 between the short and/or intermediate flutes 180, 182. Using inter-meshing long flutes 183 allows faster ejection of small diameter stalks 320, normally found at the upper-most portion of the corn plant. The intermeshing long flutes 183 of stalk rolls 190 or 192 are aerodynamically designed and assembled to create a down draft through the ear separation chamber 140, which further enhances removal of any MOTE.

The short flutes 180, intermediate flutes 182, and/or long flutes 183 may be integrally formed with one another such that a short flute 180 and/or intermediate flute 182 is formed by removing a portion of a long flute 183. As a corollary, a short flute 180 may be formed by removing a portion of an intermediate flute 182. Conversely, the various flutes 180, 182, 183 may be separately formed. Additionally, short and/or intermediate flutes 180, 182 present in either the Alignment or Entry Zones may extend to the Ear Separation and Post-Ear Separation Plant Ejection Zones, as shown in the embodiment in FIGS. 13-14E.

The height and width of the stalk engagement gap 25 have been defined previously herein with respect to FIGS. 9-10. The length of the stalk engagement gap 25 may vary from one embodiment of stalk rolls 190 to the next. For example, in the embodiment of stalk rolls 190 pictured in FIGS. 13-14E, the stalk engagement gap 25 extends from the Alignment Zone to the front of the Ear Separation Zone, which is less than half the overall length of the stalk rolls 190. However, in other embodiments of the stalk rolls 190, the length of the stalk engagement gap 25 may be different. Accordingly, the scope of the stalk rolls 190 as disclosed and claimed herein is in no way limited by the length of the stalk engagement gap 25.

As described and specifically claimed in other patents and patent applications owned by Applicant, the stripper plates 130 used with any of the stalk rolls 15, 16, 190, 400 or any other stalk rolls 130 may be beveled along their lengths, as shown in FIGS. 12 and 14B-14E. The stripper plates 130 as shown herein have a rounded or contoured surface to emulate the arched under side of the corn leaf 310 with two positive effects. First, this allows the corn leaf to stay attached to the stalk 320, reducing the level of MOTE retained in the ear separation chamber 140. Secondly, this shape also improves separation of the husk from the ear 300, further reducing the level of MOTE in the ear separation chamber 140. As shown in FIGS. 14B and 14C, the stripper plates 130 are substantially flat in the Alignment and Entry Zones, which reduces ear 300 wedging below stripper plates 130, and above the transport vanes 170 of the stalk rolls 190 when ears 300 are being gathered from near ground level. As shown in FIGS. 14D and 14E, in the Ear Separation and Post-Ear Separation Plant Ejection Zones the stripper plates 130 are normally directly above the fluted portion of stalk rolls 190 and are slightly curved down. This curve may specifically emulate the arched portion or underside of leaf 310. This improved curved shape allows smooth flow of unwanted portions of the corn plants to pass between stripper plates 130 and exit the ear separation chamber 140 while retaining the ear 300.

Figure 18:
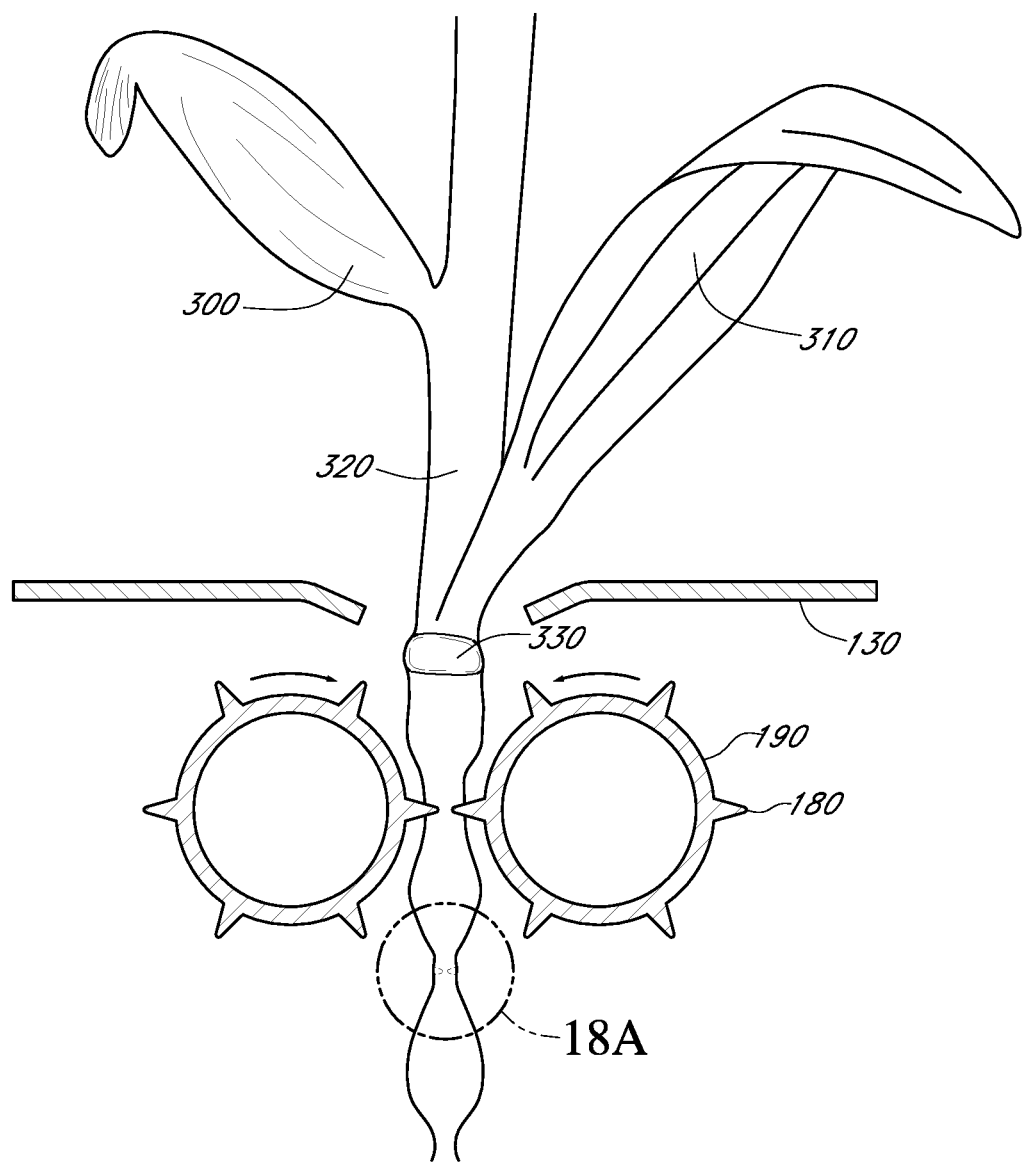
FIG. 18 is a cross-sectional view of FIG. 13 along line 14D with a stalk engaged with the stalk rolls.

As shown in FIG. 18, the embodiment shown in FIGS. 12-14E allows the flutes 180, 182, 183 and stripper plates 130 to positioned closely to one another, which reduces the amount of MOTE retained in the ear separation chamber 140 in the event that stalk 320 separation (which is defined as a cutting of the stalk 320, or other action that causes a portion of the stalk 320 to be separated from another portion thereof) takes place before ear 300 separation.

Figure 16:
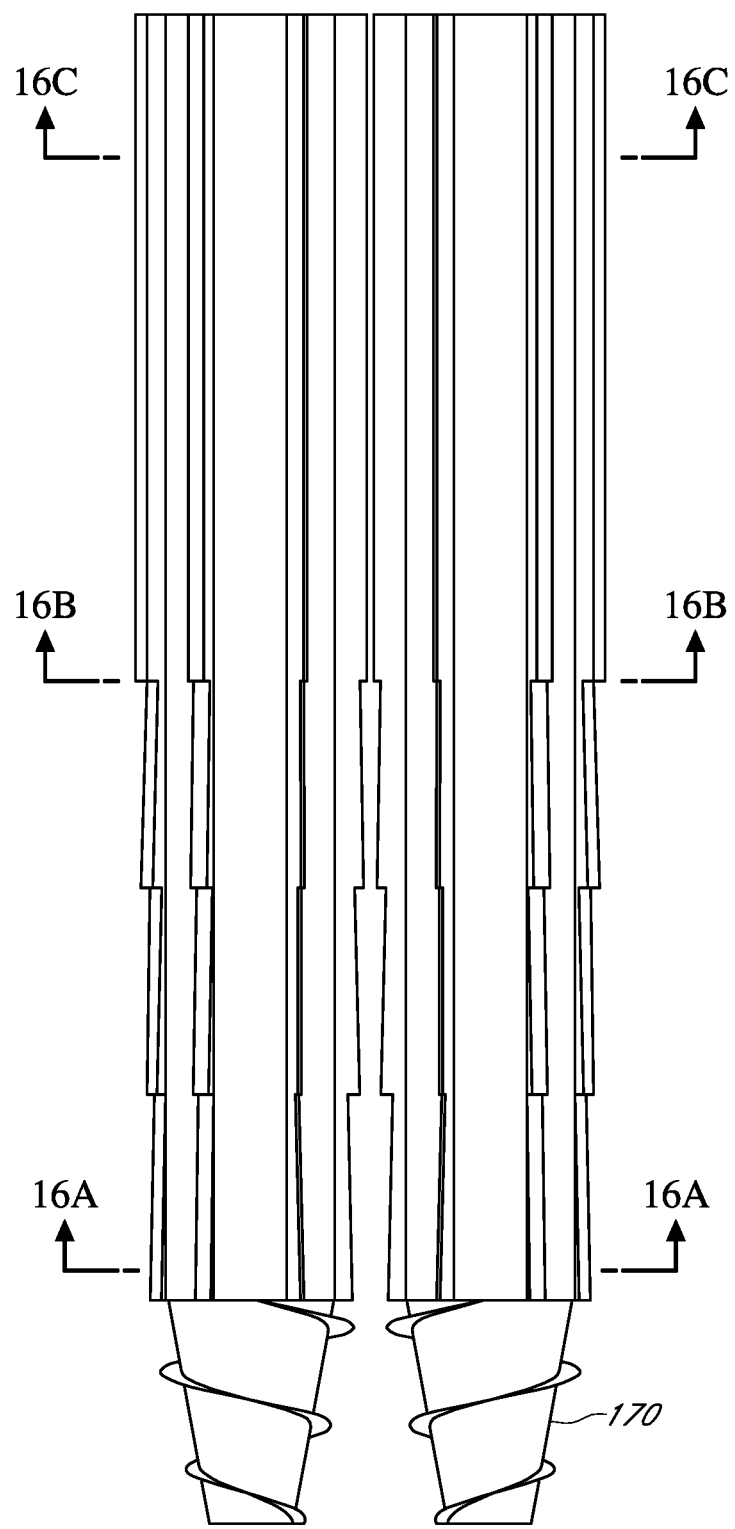
FIG. 16 is a top view of another embodiment of stalk rolls incorporating certain aspects of the present disclosure having stepped flutes showing various zones along the length of the stalk rolls.
Figure 16A:
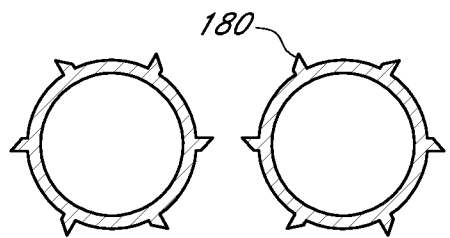
Figure 16B:
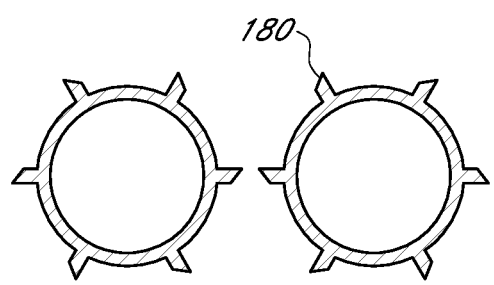
Figure 16C:
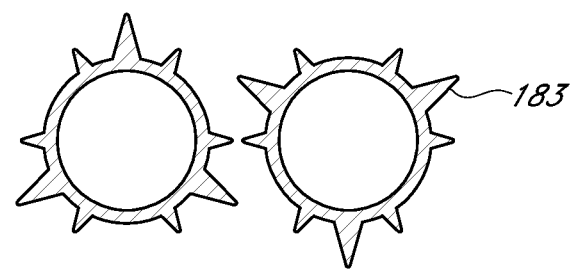

FIGS. 16-16C show another embodiment of stalk rolls 190 featuring certain aspects of the present disclosure. In this embodiment, the short flutes 180 (adjacent the area bisected by line A-A and best shown in FIG. 16A) of the stalk rolls 190 are opposed with one another so that they meet during operation. They do not, however, ever touch during normal operation. The distance between the stalk rolls 190 decreases along their length from line A-A to line B-B as shown by FIGS. 16A-16C. Additionally, long flutes 183 are positioned on the stalk rolls 190 adjacent the back thereof about line C-C. This configuration provides optimum balanced pressure against the stalk 320 in certain conditions to first engage the stalk 320 and then pull it down while penetrating the stalk outer shell 321, thus avoiding stalk whip during engagement of the stalk 320.

In this embodiment of stalk rolls 190, the short and intermediate flutes 180, 183 may be integrally formed with one another and distinguished from one another via a stair-step configuration. The distance between opposing flutes 180, 182, 183 may be reduced in discrete increments along the length of the stalk rolls 190, as best shown in FIG. 16. These stalk rolls 190 could also be configured to have a stalk engagement gap 25 as previously described. Furthermore, any of the stalk rolls 15, 16, 190, 400 described or pictured herein may have any number of flutes 180, 181, 182, 183 extending radially any suitable distance from the stalk roll 15, 16, 190, 400, and may have a combination of tapered flutes 181 and other flutes 180, 182, 183. For example, in one embodiment of a stalk roll 190 not pictured herein, the Ear Separation Zone may include flutes 180, 182, 183 having four different radial dimensions, with tapered flutes 181 interspersed there about. Accordingly, the scope of the stalk rolls 15, 16, 190, 400 as disclosed and claimed herein is not limited by the number of different radial dimensions by which flutes 180, 181, 182, 183 extend from the stalk rolls 190. In another embodiment of the stalk rolls 190, the distance between the flutes 180, 182, 183 may be reduced discretely but there may also be a taper between those discrete points.

3. Tapered Stalk Rolls

A further improvement described herein compromises tapering the stalk rolls to modify the configuration of the Entry Zone to further improve performance of the Entry Zone. The tapered stalk rolls 192 shown in FIGS. 15-15C exploit a natural attribute present in standing corn—the diameter of the stalk 320 at its base (i.e., ground level) is larger than its diameter toward the tip or tassel. The largest gap between the tapered stalk rolls 192 is at the entry to the stalk rolls 192 near the front; the smallest gap is at the point of exit of the stalk rolls 192 near the rear. This taper in the stalk rolls 192 balances the outward forces created by the stalk 320 against the tapered flutes 181 and the inward force of the tapered flute 181 against the stalk 320. An imbalance of the forces can create a pulsation in the stalk rolls 192 during operation. This pulsation creates a moment about the gearbox that can produce premature failure in the gearbox or its supporting mechanisms. Tapering the stalk rolls 192 reduces the potential for pulsation while promoting entry of the stalks 320 between the stalk rolls 192 and allowing aggressive engagement between the stalk rolls 192 and the stalk 320. The tapering may be achieved by changing the diameter of the stalk rolls 192 along their length or the radial distance that the tapered flutes 181 extend from the stalk roll 192.

Figure 15:
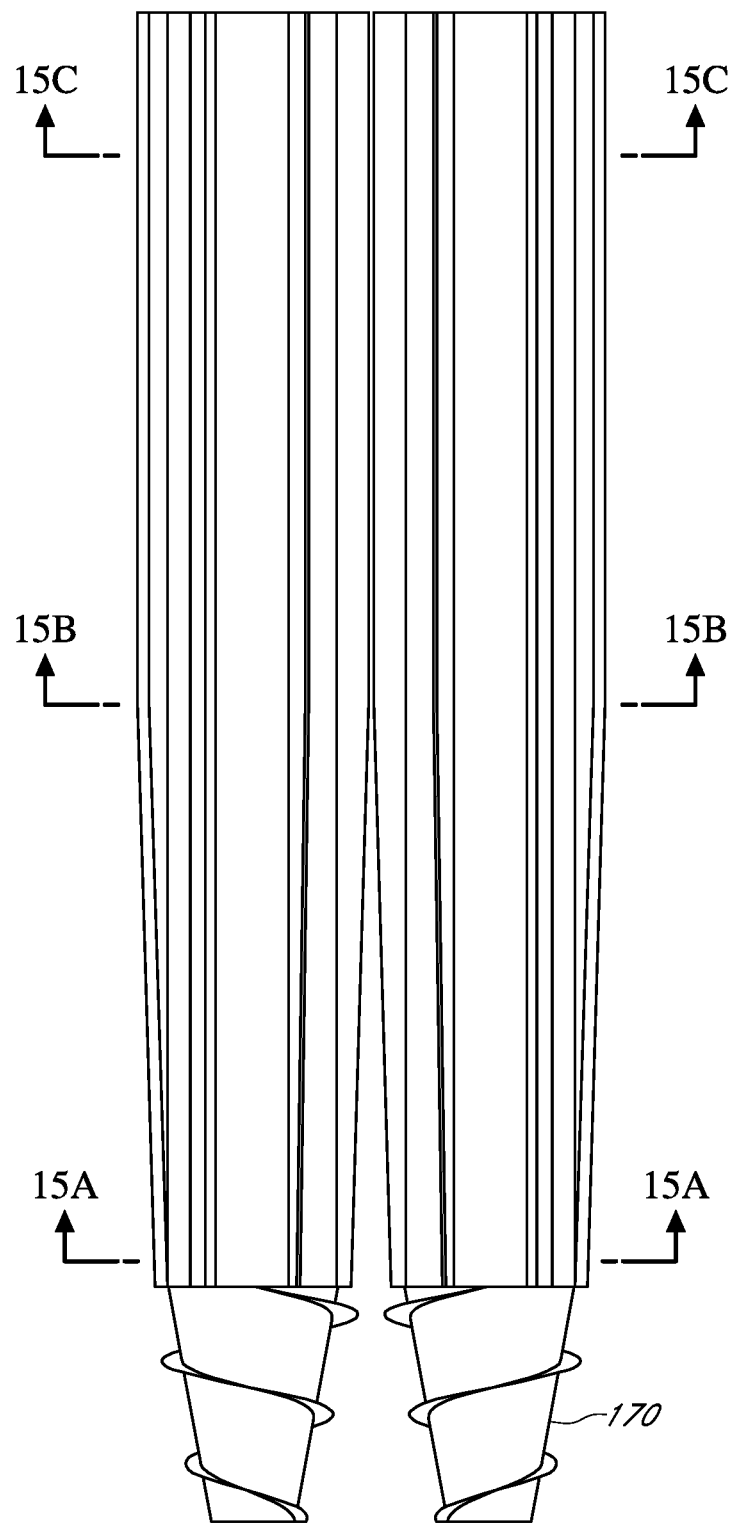
FIG. 15 is a top view of another embodiment of stalk rolls incorporating certain aspects of the present disclosure having tapered flutes showing various zones along the length of the stalk rolls.
Figure 15A:
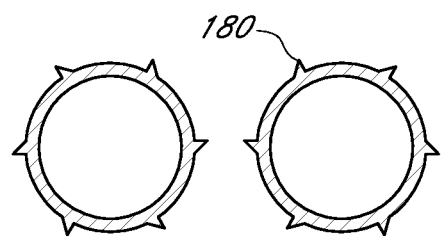
Figure 15B:
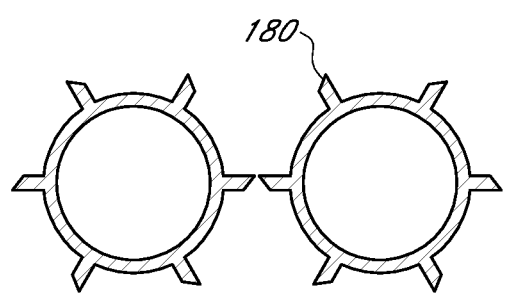
Figure 15C:
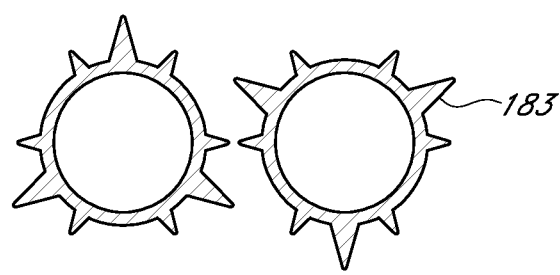

The embodiment of stalk rolls 192 having tapered flutes 181 shown in FIGS. 15-15C are configured for the tapered flutes 181 in the Alignment/Entry Zone (the area about line A-A) and Ear Separation Zones (the area about line B-B) to be opposed, as clearly shown in FIGS. 15B and 15A. Conversely, the tapered flutes 181 in the Post-Ear Separation Plant Ejection Zone (the area about line C-C) are intermeshing, as best shown in FIG. 15C. During operation, as a stalk 320 is engaged by the stalk rolls 192, the distance between the tapered flutes 181 and the opposing stalk roll 192 is reduced, thereby increasing penetration of the stalk 320 by the tapered flutes 181 and exerting continuous pressure against the stalk 320 during engagement.

Figure 17:
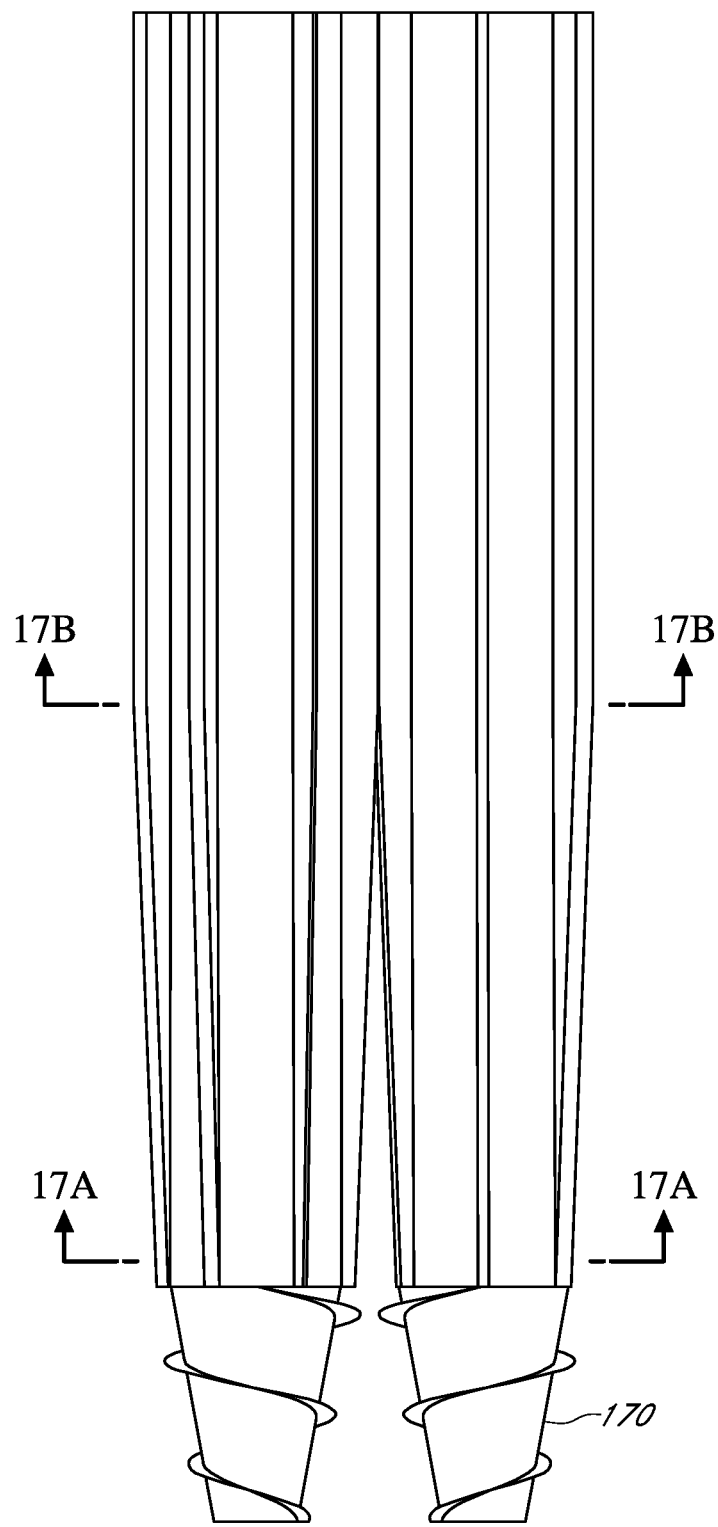
FIG. 17 is a top view of another embodiment of stalk rolls incorporating certain aspects of the present disclosure having tapered flutes showing various zones along the length of the stalk rolls.
Figure 17A:
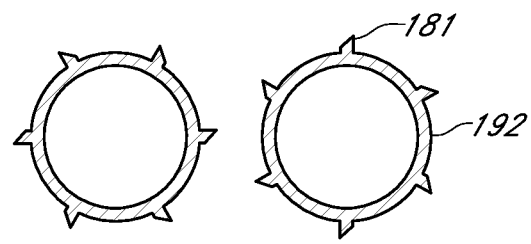
Figure 17B:
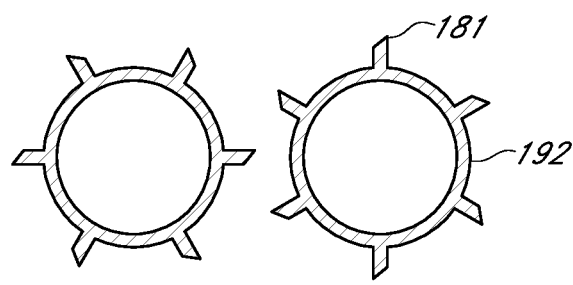

Another embodiment of stalk rolls 192 having tapered flutes 181 is shown in FIGS. 17-17B. In this embodiment, all the tapered flutes 181 are intermeshing with one another, as is clearly shown in FIGS. 17A and 17B. In this embodiment of stalk rolls 192, the various zones previously described are comingled such that clear boundaries between the zones do not exist. Instead, the transition from one zone to the next is smooth and seamless. However, any embodiment of tapered stalk rolls 192 may be configured with a stalk engagement gap 25 by simply removing a portion of certain tapered flutes 181.

Both the tapered stalk rolls 192 and the stalk rolls 190 shown in FIGS. 13, 14, and 16 are configured to achieve variable circumferential speeds along the length of the stalk rolls 190, 192. There are at least three critical circumferential speed ratios related to ground speed for optimum high efficiency harvesting. The three critical speed ratios are: (1) Harvesting machine ground speed to row unit horizontal gathering chain speed 120 (the gathering chain 120 speed must be the same as or faster than the ground speed); (2) Harvesting machine ground speed to the speed at which the transport vanes 170 horizontally guide stalks 320 into the ear separation chamber 140; and, (3) harvesting machine ground speed to row unit vertical ear separation speed. The vertical ear separation speed (sometimes referred to as vertical stalk speed) must be the same as or faster than the ground speed. However, the maximum vertical stalk speed before ear 300 separation is the highest speed at which the ears 300 are not damaged upon impact within the row unit. Each of these critical speed ratios constrains the operating speed of each zone described herein. Operating outside the critical speed ratio constraints within each zone produces sub-optimal performance.

Optimizing all the critical speed ratios, as required by high-speed, high-yield, and/or harvesting in leaning, lodged, or broken stalk 320 conditions, may require the effective circumferential speed and interaction of the multi-length, multi-angled, multi-fluted, multi-vaned stalk rolls 15, 16, 190, 192, 400 described in each in zone to vary while accomplishing the functions described in each zone. Applicant understands that the various speed ratios are interrelated and effective row unit designs must recognize and incorporate these varied speed ratios to ensure corn plant(s) remain vertical or lean slightly toward the corn head upon engagement. Harvesting corn plants in this manner promotes ear separation in the targeted Ear Separation Zone and away from the front of the row unit. Targeting ear separation in this zone, and manner, reduces losses from ears 300 falling forward out of the corn head row unit and onto the ground; thereby becoming irretrievable.

4. Recessed Stalk Rolls

Figure 21A:
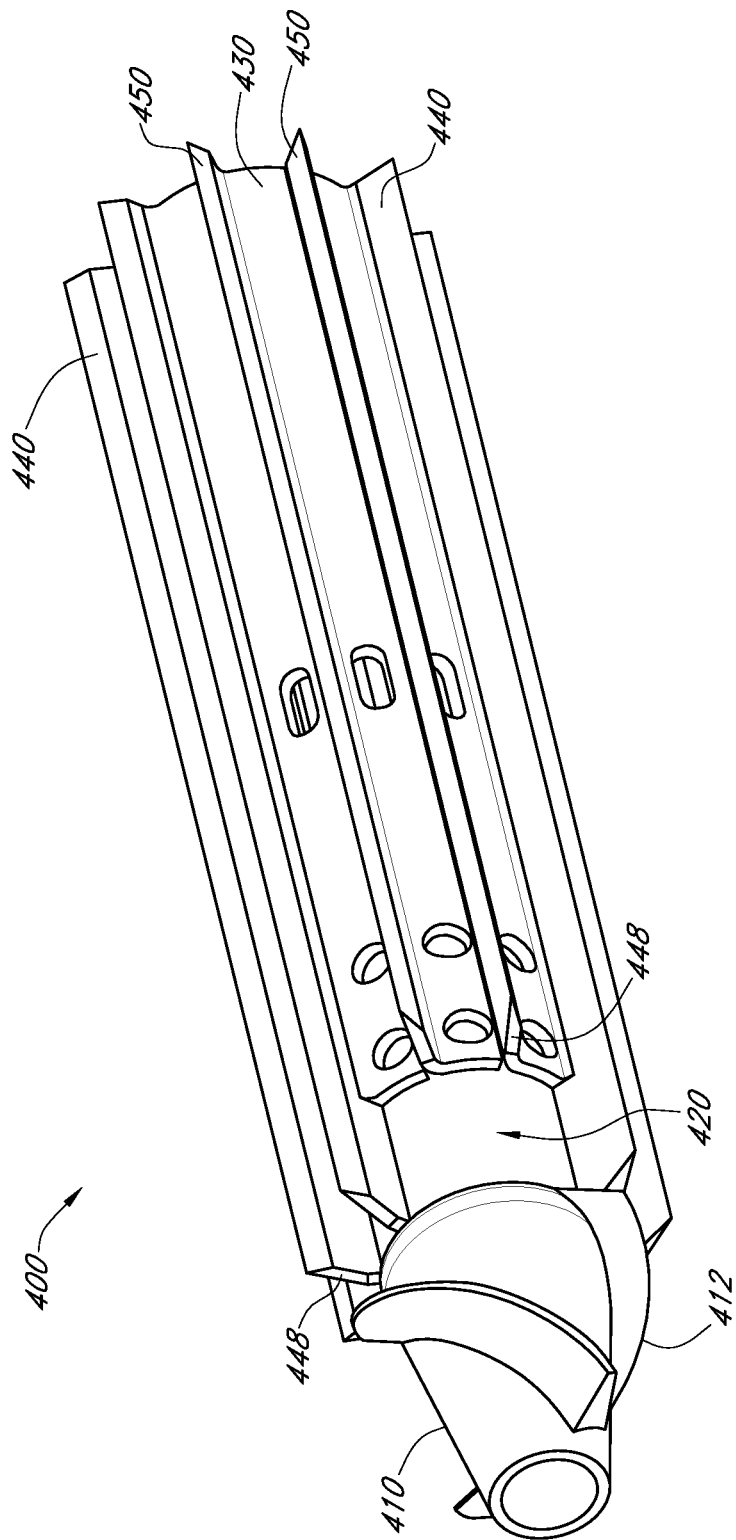
FIG. 21A is a perspective view of a first embodiment of a stalk roll having a recess.
Figure 21B:
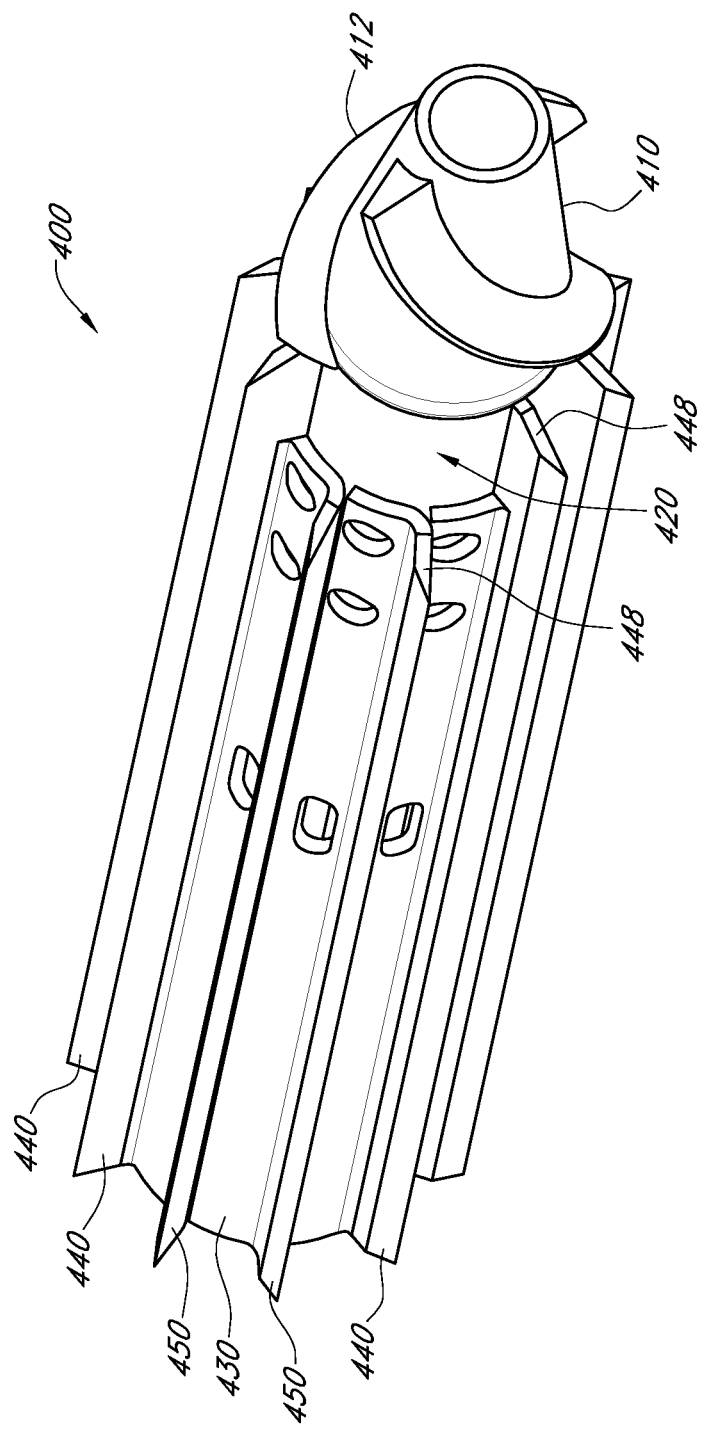
FIG. 21B is a second perspective view of the first embodiment of a stalk roll having a recess.
Figure 21C:
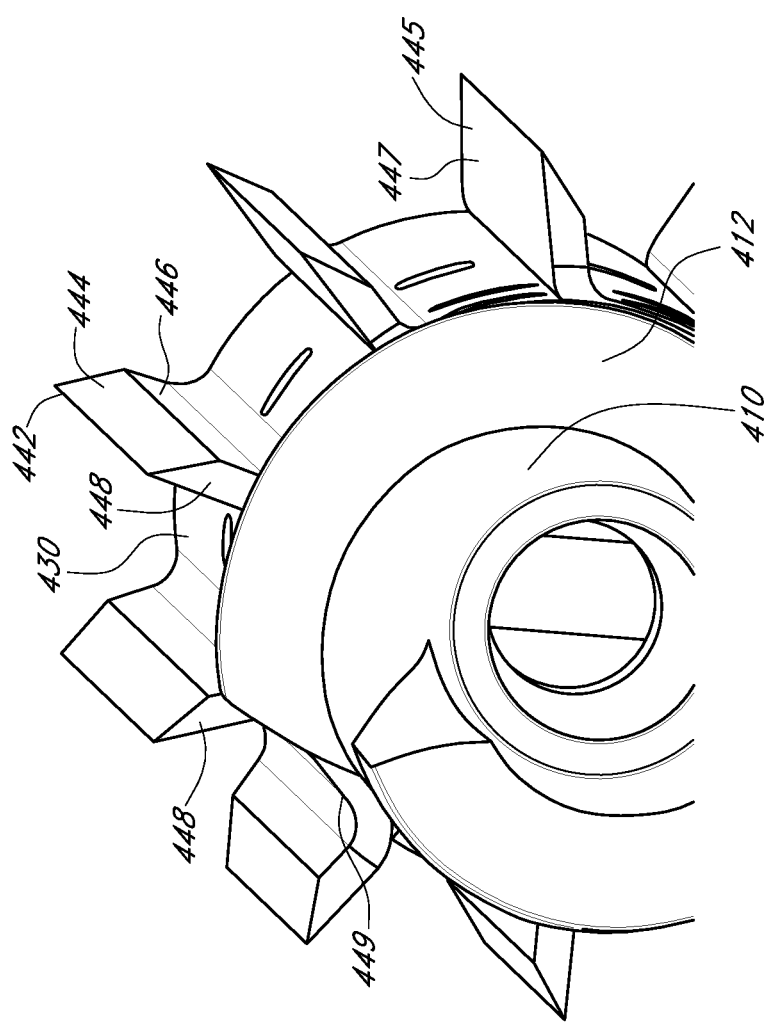
FIG. 21C provides a detailed view of a flute in the first embodiment of a stalk roll having a recess.
Figure 22A:
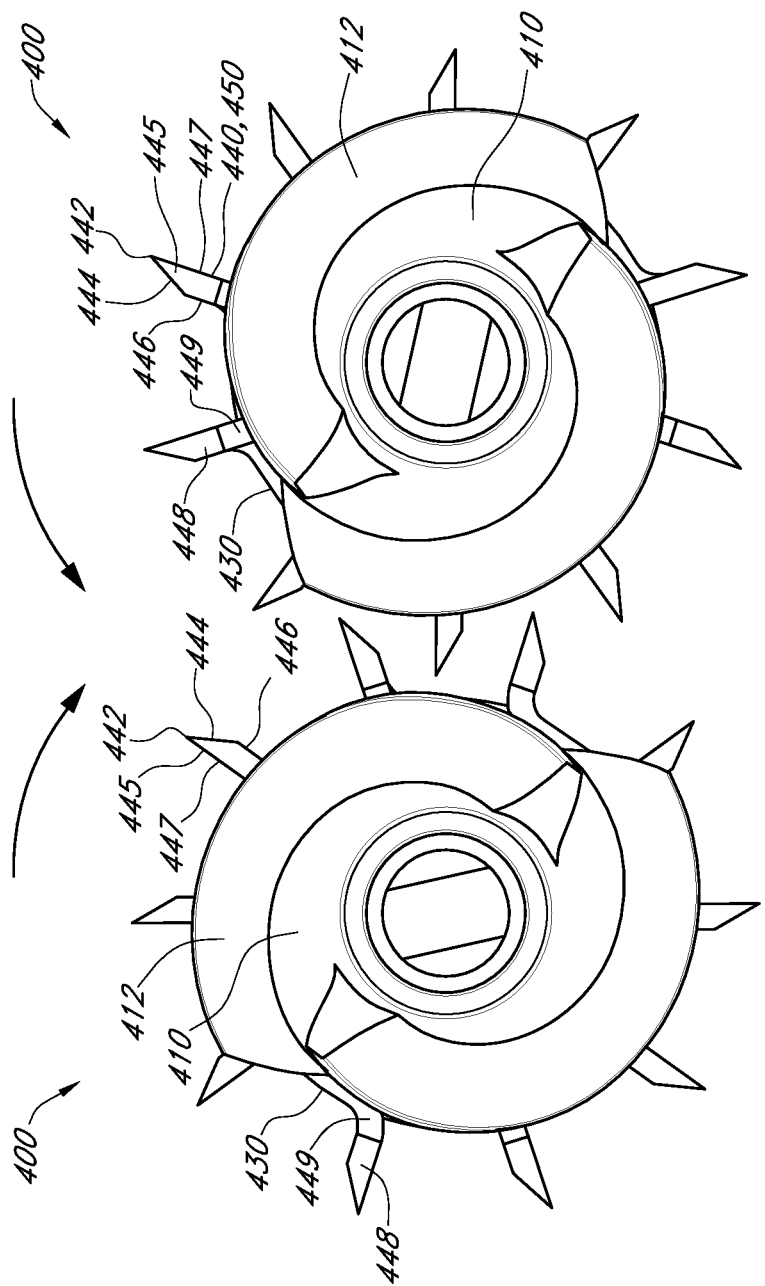
FIG. 22A is an end view of the first embodiment of two stalk rolls having recesses intermeshed with one another.

Another embodiment of a stalk roll 400 having a stalk engagement gap 25 is shown in FIGS. 21-22. FIGS. 21A and 21B provide corresponding perspective views of the stalk roll 400, which is designed to be one of a pair of opposed, counter-rotating stalk rolls 400 mounted to a corn head row unit in a manner previously described. The stalk rolls 400 are shown with nose cones 410 having flighting 412 attached thereto. Typically, the nose cone 410 is shaped substantially as a cone, as shown in the embodiments of stalk rolls 400 pictured herein. The flighting 412 is configured to guide stalks 320 into the ear separation chamber 140 as previously described.

FIGS. 21-22 illustrate a first embodiment of a stalk roll 400 having a recess 420, as described in detail below.

Each stalk roll 400 may be formed with a main cylinder 430 having a recess 420 formed therein between the front end of the main cylinder 430 and the nose cone 410 as shown in FIGS. 21A and 21B. The recess 420 may extend along the entire circumference of the stalk roll 400 (i.e., an annular recess 420). The recess 420 may be formed in the nose cone 410, or it may be formed as a separate cylinder that is later affixed to both the main cylinder 430 and the nose cone 410. The diameter of the recess 420 is less than the diameter of either the main cylinder 430 or the rearward end of the nose cone 410, which is apparent from FIGS. 21A and 21B. The length of the recess 420 may vary from one embodiment of the stalk roll 400 to the next, but it is contemplated that for most embodiments the length of the recess 420 will be from 1.5 to 6 inches in length. Additionally, for certain embodiments it is contemplated that the diameter of the recess 420 will vary along its length. Accordingly, the specific dimensions of the recess 420 are in no way limiting.

The embodiment of the stalk rolls 400 shown in FIGS. 21-22 include a total of ten flutes 440, 450, wherein six of those are full flutes 440 and four of those are reduced flutes 450. However, other embodiments of the stalk rolls 400 may have other numbers of full flutes 440 and/or reduced flutes 450 to achieve a different number of total flutes 440, 450 and/or ratio of full flutes 440 to reduced flutes 450. Additionally, the reduced flutes 450 need not be the same length. The flutes 440, 450 extend in a radial direction from the main cylinder 430 and/or recess 420. The flutes 440, 450 in the embodiment shown in FIGS. 21-22 are substantially parallel to the longitudinal axis of the stalk roll 400 and substantially perpendicular to a line tangent to the main cylinder 430 at the flute base 449.

Figure 23:
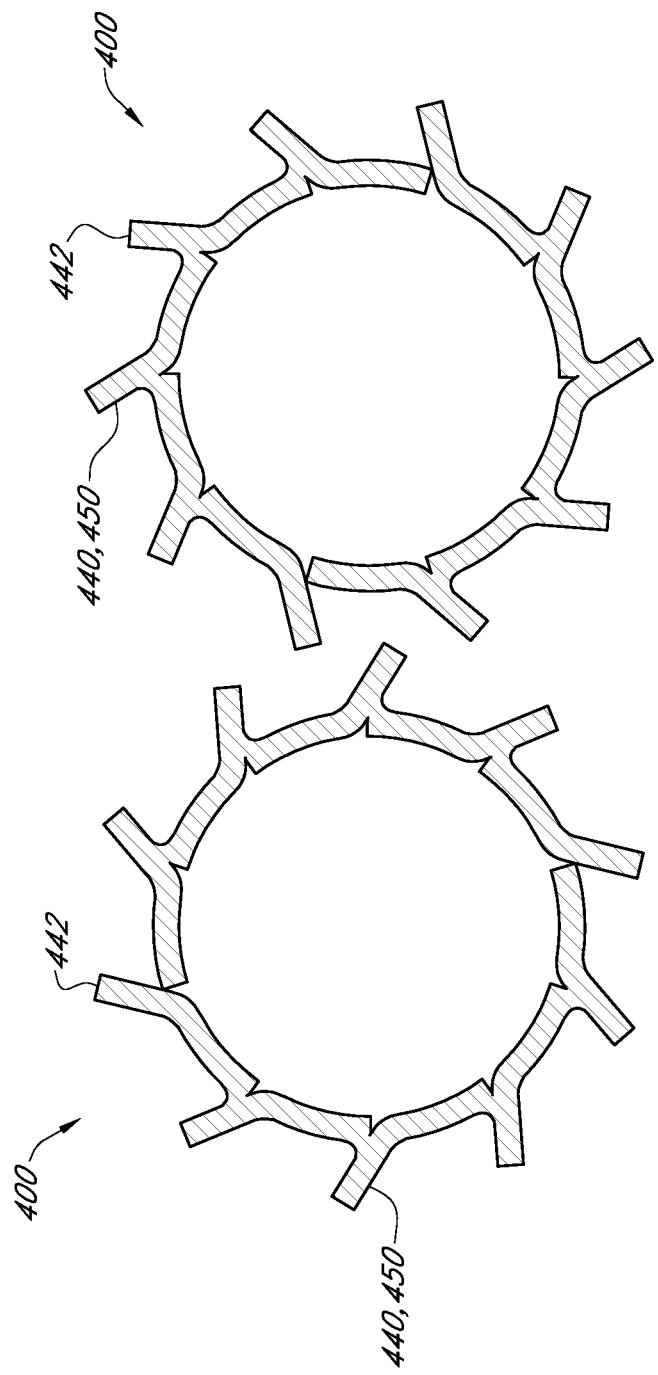
FIG. 23 is a cross-sectional view of a second embodiment of two stalk rolls having a recess intermeshed with one another.

In a second embodiment of the stalk roll the flutes 440, 450 are oriented differently with respect to lines that are tangent to the main cylinder 430 at the flute base 449. For example, FIG. 23 provides an end view of two stalk rolls 400 intermeshed with one another wherein the flutes 440, 450 are angled forward with respect to the direction of rotation of the stalk rolls 400.

Accordingly, the angle of the flutes 440, 450 with respect to lines that are tangent to the main cylinder 430 at the flute base 449 in no way limits the scope of the stalk rolls 400 as disclosed and claimed herein.

In the first embodiment of the stalk roll 400, the full flutes 440 extend from the rearward end of the main cylinder 430 through the recess 420 and to the rearward end of the nose cone 410, as shown in FIGS. 21A and 21B. The reduced flutes 450 may extend from the rearward end of the main cylinder 430 to the rearward end of the recess 420. In the first embodiment of the stalk roll 400, the reduced flutes 450 are oriented in two pairs on opposite sides of the stalk roll 400 and the full flutes 440 are arranged in groups of three on opposite sides of the stalk roll 400. The circumferential distance between the flutes 440, 450 may be equal, and in the first embodiment the flutes 440, 450 are positioned at thirty six degrees from each adjacent flute 440, 450.

A detailed view of the flutes 440, 450 is shown in FIG. 21C. As shown, each flute 440, 450 includes a flute edge 442 at the vertex of a leading surface 444 and a trailing surface 445. The leading and trailing surfaces 444, 445 may be connected to the main cylinder 430 and/or recess 420 (depending on whether it is a full flute 440 or reduced flute 450) with a flute base 449. The flute base 449 may have a leading wall 446 adjacent the leading surface 444 and a trailing wall 447 adjacent the trailing surface 445. In the first embodiment of the stalk roll 400, a pair of stalk rolls 400 is mounted such that stalk roll 400 rotates toward the leading surface 444 and leading wall 446, as shown by the arrows in FIG. 22.

Each flute 440, 450 may be formed with a beveled edge 448 on the front axial surface thereof. In certain conditions, a beveled edge 448 provides easier entry for a stalk 320 into the corn plant engagement chamber. In the embodiment shown in FIGS. 21-22, the beveled edge 448 is angled at 30 degrees with respect to the vertical. However, in other embodiments the beveled edge 448 may be differently configured without limitation.

In the first embodiment of the stalk roll 400 the trailing wall 447 and trailing surface 445 are integral and linear, but may have other configurations in other embodiments of the stalk roll 400.

In the first embodiment the leading surface 444 is angled at thirty degrees with respect to the leading wall 446, which also creates an angle of thirty degrees between the leading surface 444 and trailing surface 445 (and trailing wall 447 in the first embodiment). Through testing, Applicant has found that this orientation allows the flutes 440, 452 to effectively secure the stalk 320 during ear 321 removal and subsequently process the stalk 320 for accelerated decomposition. Additionally, this orientation allows the stalk rolls 400 to properly release the stalk 320 after the ear 321 has been removed so that the stalk 320 does not wrap around the stalk roll 400. Other orientations and/or configurations of leading surfaces 444, trailing surfaces 445, leading walls 446, trailing walls 447, and/or flute bases 449 may be used in other embodiments of the stalk roll 400 without limitation.

The embodiment shown in FIG. 23 includes leading and trailing surfaces 444, 445 that are substantially parallel to one another and create a flute edge 442 that is substantially flat, which may be optimal in conditions in which it is desired that the stalk 320 be pulverized rather than cut/lacerated. The angle between the leading and trailing surfaces 444, 445 and the flute edge 442 in the embodiment in FIG. 23 may be different than shown herein without limitation. The optimal configuration will vary at least based on the threshing conditions and plant variety. In the pictured embodiment, the flute edge 442 is perpendicular with respect to both the leading and trailing edges 444, 445 so that the stalk rolls 400 properly release the stalk 320 after processing. However, other configurations will be preferred for other operating conditions.

FIG. 22 shows an end view of two cooperating stalk rolls 400 configured according to the first embodiment. The stalk rolls 400 in this figure are shown substantially as they would appear when mounted on a corn head row unit. As shown, the stalk rolls 400 are mounted such that one pair of reduced flutes 450 on opposing stalk rolls 400 are adjacent one another twice during a full revolution of the stalk rolls 400. This creates two stalk engagement gaps 25 per revolution that extend the length of the recess 420. That is, the length of the stalk engagement gap 25 in the first embodiment of the stalk rolls 400 is equal to the difference in the length between the full flutes 440 and reduced flutes 450, which is also equal to the length of the recess 420. In the first embodiment of the stalk roll 400 having a recess 420, the width of the stalk slot 7 is defined by the distance between the inner peripheries of the main cylinders 430 of the opposing stalk rolls 400. The recess 420 increases the effective width of the stalk engagement gap 25 by two times the difference in diameter between the main cylinder 430 and the recess 420. Furthermore, the recess 420 facilitates the positioning of a stalk 320 between the flute edge 442 of a full flute 440 and the recess 420 when the stalk engagement gap 25 is not present in the stalk slot 7. This ensures that stalks 320 will move rearward along the length of the stalk rolls 400 during harvesting rather than stalling at the front of the stalk rolls 400 or being pushed forward to the nose cone 410. In embodiments of the stalk roll 400 in which the depth of the recess 420 is not constant along its length, the width of the stalk slot 7 is also not constant.

Figure 22B:
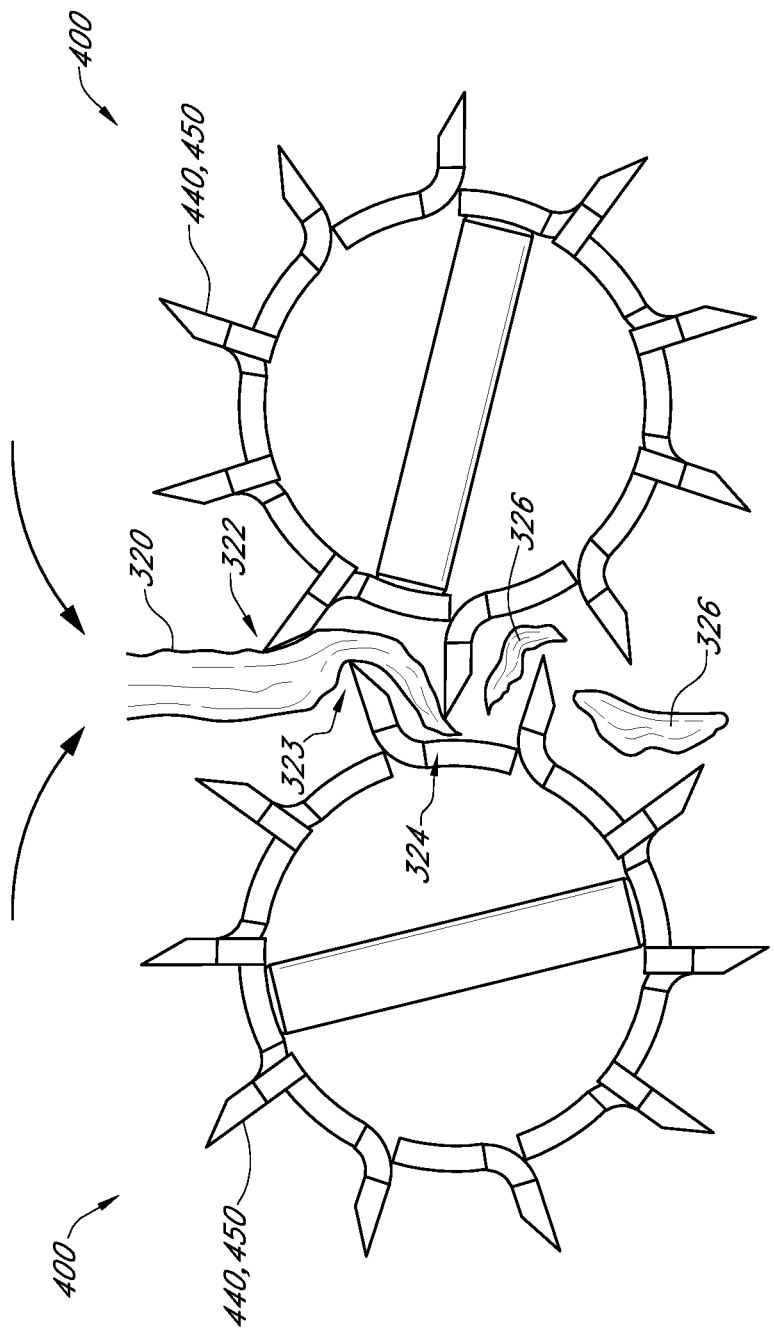
FIG. 22B is another end view of the first embodiment of two stalk rolls having recesses intermeshed with one another wherein the nose cone has been removed for clarity.

The embodiment of stalk rolls 400 shown in FIGS. 21-22 effectively remove ears 300 from a stalk 320 and also cut the stalk 320 upon ejection from the stalk rolls 400. This is achieved through the simultaneous grasp and control of the stalk 320 by a first pair of flutes 440, 450 while a second flute 440, 450 below the first pair cuts the stalk 320. This situation is shown schematically in FIG. 22B. The first pair of flutes 440, 450 secure the stalk 320 by engaging at it first and second grasp points 322, 323. This grasp and control of the stalk 320 allows another flute 440, 450 positioned below but adjacent the second grasp point 323 to produce a stalk cut point 324. This functionality requires a plurality of flutes 440, 450 spaced less than sixty degrees from adjacent flutes 440, 450. That is, at least seven flutes 440, 450 are required, and the embodiment pictured herein employs ten flutes 440, 450.

Applicant expected stalk rolls 400 as shown in FIGS. 21-22 to increase the amount of MOTE produced during harvesting compared to otherwise-identical six-flute stalk rolls. However, field testing showed that the ten-flute stalk rolls 400 actually produced less MOTE while simultaneously more effectively mutilating the stalk 320 than did the six-flute stalk rolls. Moreover, the ten-flute stalk rolls 400 operated consistently in multiple conditions, including high moisture (e.g., early morning or late evening harvesting), low moisture, and various varieties of corn plants.

The cutting function at the stalk cut point 324 is enhanced by the secure engagement of the stalk 320 at the first and second grasp points 322, 323 and the forward slope of the leading surface 444. Instead of slipping past the flute edge 442 at the stalk cut point 324, the stalk 320 is secured by the first and second grasp points 322, 323 so that the flute edge 442 at the stalk cut point 324 can fully penetrate the stalk 320. This allows the stalk rolls 400 to eject a plurality of stalk pieces 326 that resemble confetti.

Other embodiments of stalk rolls 400 incorporating a recess 420 may have additional or fewer flutes 440, 450 extending other distances along the length of the stalk roll 400. Additionally, any considerations, designs, and/or orientations previously discussed for other stalk rolls 15, 16, 190, 192 may be incorporated with stalk rolls 400 having a recess 420. For example, intermediate flutes 182, tapered flutes 181, and/or long flutes 183 may be positioned on the stalk roll 400 at various positions thereof. Additionally, the considerations of the various zones described in detail above may be incorporated into the design of the stalk rolls 400.

5. Other Row Unit Considerations

As shown in the embodiment of a corn head row unit in FIG. 20 the stalks 320 are lifted and guided toward the row unit by dividers 100. Gathering chain 120 may be formed with enlarged gathering chain paddles 110, which help to direct the stalks 320 and/or ears 300 toward the ear separation chamber 140. The stalks 320 may be further centered into the ear separation chamber 140 by improved stripper plates 130 described in detail above. Enlarged gathering chain paddles 110 have an increased angle relative to the gathering chain 120, which allow the gathering chain paddles 110 to engagement a larger number of stalks 320 and/or corn plants, especially when harvesting leaning and/or lodged corn.

Stalks 320 are gathered and further propelled rearwardly by means of the force imparted by transport vanes 170 on the nose cones 5, which are oppositely wound and strategically timed to be horizontally opposite. The transport vanes 170 positively direct and lock the stalk 320 into the Alignment and Entry Zones, both of which may be configured with a stalk engagement gap 25. Alternatively, the stalk engagement gap 25 may be replaced and/or supplemented with stalk rolls 190 having tapered flutes 181 as shown in FIGS. 15-15C and 17-17B. The strategic lateral speed imparted to the stalk 320 by rotating transport vanes 170 is determined by the angle of the transport vanes 170. This lateral speed may be equal to or faster than the lateral speed imparted to the stalk 320 by gathering chain paddles 110.

In the embodiment of a row unit shown in FIG. 20, the reduced number of enlarged gathering chain paddles 110 increases the conveying capacity of the row unit in the ear separation chamber 140 to carry separated ears 300 rearward. This improved capacity increases the conveying efficiency of the gathering chain paddles 110 to the cross auger trough 200, which contains auger 220 and flighting 230 for conveying ears 300 to the feeder house area.

Figure 18A:
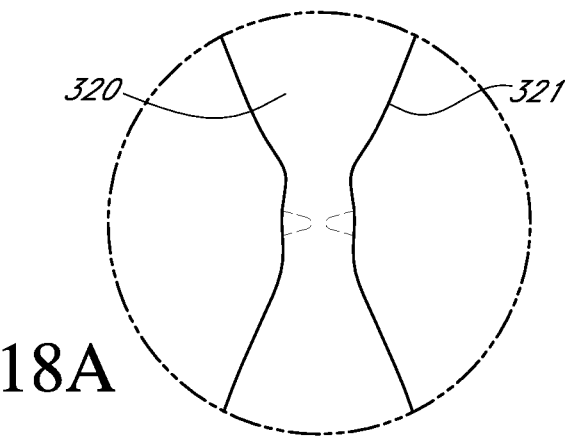
FIG. 18A is a detailed view of the stalk after penetration of the stalk by the stalk roll.

FIGS. 18 and 18A show how the tapered flute-to-flute design stalk rolls 192 may work in certain conditions. As the stalk rolls 192 rotate, the sharpened edges of the flutes 181 penetrate the stalk outer shell 321. The penetration of the tapered flutes 181 combined with the rotation of the stalk rolls 192 may simultaneously pull and lacerate the stalk 320. Because the entire row unit is moving forward during operation, the tapered flutes 181 penetrate deeper and deeper into the stalk 320 as it is pulled down into the row unit. The difference in height between the tapered flutes 181 and the stalk roll 192 results in a continuous compressing/decompressing action against the stalk 320, which may crimp the stalk 320.

Figure 19A:
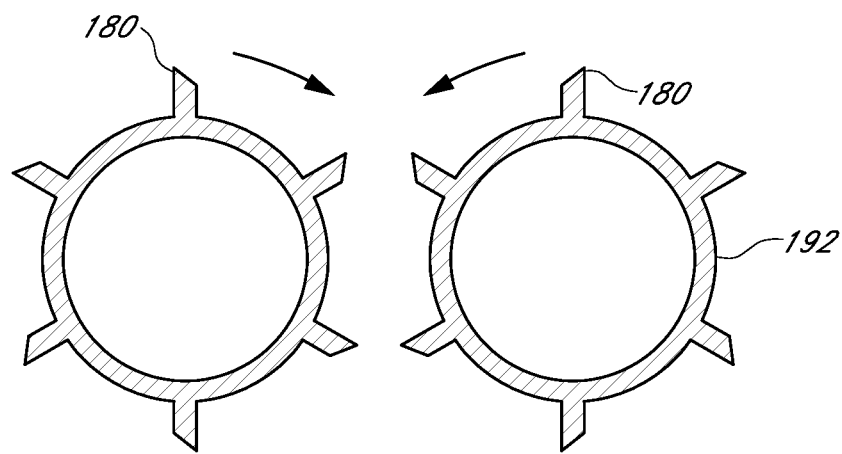
FIG. 19A is a cross-sectional view of one embodiment of stalk rolls incorporating certain aspects of the present disclosure showing the angle of the flute edges prior to engagement with a stalk.
Figure 19B:
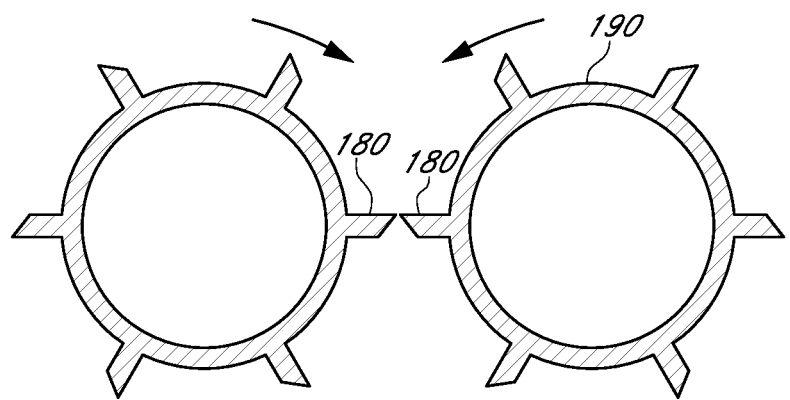
FIG. 19B is a cross-sectional view of one embodiment of stalk rolls incorporating certain aspects of the present disclosure showing the angle of the flute edges as they would be during engagement with a stalk.

FIGS. 19A and B illustrate the non-meshing stalk rolls 190 as they rotate during operation. In FIG. 18A, flutes 180 are marked at the top of the rotation prior to contact with the stalk 320. As the stalk roll 190 rotates, the edge of the flutes 180 will engage and begin to pinch the stalk 320. In FIG. 19B, flutes 180 have been rotated ninety degrees. The opposing flutes 180 are directly opposite each other. The pressure exerted by flutes 180 on the stalk 320 has lead to penetration of the stalk 320. The rotation of the stalk roll 190 has pulled the stalk 320 down into the corn row unit. Penetration by the flutes 180 is at maximum depth in FIG. 18B. Opposing flutes 180 do not touch each other during the cycle to avoid cutting through the stalk 320 in this embodiment. The angle of the knife edges of the flutes 180 have a predetermined slope, as described. The angle of the slopes are forward with respect to the direction of rotation of the stalk rolls 190.

Any of the stalk rolls 15, 16, 190, 192, 400 may be mounted either in a cantilevered or non-cantilevered manner, with or without nose bearings. Additionally, any of the stalk rolls 15, 16, 190, 192, 400 may be oriented in opposing, knife-to-knife configurations or intermeshed and/or interleaved configurations. As previously mentioned, non-meshing and horizontally opposite configured flutes 180, 181, 182, 183 cause the flute edges to pinch the stalk 320 simultaneously as they rotate, thus providing that the resultant equal forces are applied to both sides of the engaged stalk 320 so as to eliminate corn plant whip. This keeps the stalk 320 perpendicular and reduces any whipping action that prematurely dislodges ears 300 from the stalk 320 or snaps the stalk 320 at the stalk node 330. The remaining flutes 180, 181, 182, 183 of stalk roll 190 may then further pinch the stalk 320 pulling it down and rearward so that the ears 300 are removed from the stalks 320 as they come into contact with the desired Ear Separation Zone of stripper plates 130.

In any of the embodiments of stalk rolls 15, 16, 190, 192, 400 the various flutes 18, 19, 20, 21, 26, 33, 180, 181, 182, 183, 440, 450 may be self sharpening, or may have a work hardened knife/flute edge 22, 442. Furthermore, any of the knife/flute edges 22, 442 disclosed herein may be coated with various materials, such as chrome, tungsten carbide, or any other materials that is suitable for the specific application.

The stalk rolls 15, 16, 190, 192, 400 and various elements thereof may be constructed of any suitable material known to those skilled in the art or suitable for a specific application. In the embodiment as pictured herein, it is contemplated that most elements will be constructed of metal or metallic alloys, polymers, or combinations thereof. However, other suitable materials may be used.

It should be noted that the stalk rolls 15, 16, 190, 192, 400; flutes 18, 19, 20, 21, 26, 33, 180, 181, 182, 183, 440, 450; stripper plates 3, 130; gathering chain paddles 1, 110; nose cones 5, 410; row dividers 4, 100 and any other element and/or feature described herein are not limited to the specific embodiments pictured and described herein, but is intended to apply to all similar apparatuses and methods for providing the various benefits of those elements, which benefits include but are not limited to increasing the harvesting quality and/or speed of a harvesting machine. Modifications and alterations from the described embodiments will occur to those skilled in the art without departure from the spirit and scope of the stalk rolls 15, 16, 190, 192, 400.

Furthermore, variations and modifications of the foregoing are within the scope of the stalk rolls 15, 16, 190, 192, 400. It is understood that the stalk rolls 15, 16, 190, 192, 400 as disclosed and defined herein extends to all alternative combinations of one or more of the individual features mentioned or evident from the text and/or drawings. All of these different combinations constitute various alternative aspects of the stalk rolls 15, 16, 190, 192, 400. The embodiments described herein explain the best modes known for practicing the stalk rolls 15, 16, 190, 192, 400 and will enable others skilled in the art to utilize the same. The claims are to be construed to include alternative embodiments to the extent permitted by the prior art.

Having described the preferred embodiment, other features, advantages, and/or efficiencies of the stalk rolls 15, 16, 190, 192, 400 will undoubtedly occur to those versed in the art, as will numerous modifications and alterations of the disclosed embodiments and methods, all of which may be achieved without departing from the spirit and scope of the stalk rolls 15, 16, 190, 192, 400.

The invention claimed is:

1. A method of processing a stalk, said method comprising the steps of:
   a) positioning said stalk between first and second stalk rolls, wherein both said first and second stalk rolls are configured with at least seven flutes each thereon extending radially from said first and second stalk rolls;
   b) grasping said stalk by engaging said stalk between a first flute affixed to said first stalk roll and a main cylinder on said second stalk roll at a first grasp point;
   c) controlling said stalk by engaging said stalk between a first flute affixed to said second stalk roll and a main cylinder on said first stalk roll at a second grasp point; and,
   d) cutting said stalk by engaging said stalk between a second flute affixed to said first stalk roll and said main cylinder on said second stalk roll at a stalk cut point.

2. The method according to claim 1 wherein said main cylinder of both said first and second stalk rolls is further defined as including a recess formed therein, and wherein said recess is positioned toward the front of said first and second stalk rolls.

3. The method according to claim 1 wherein said first flute affixed to said first stalk roll is further defined as comprising:
   a) a leading surface;
   b) a trailing surface angled with respect to said leading surface, wherein an angle between said trailing surface and said leading surface is less than sixty degrees; and,
   c) a flute edge defined by said leading surface and said trailing surface, wherein said flute edge resides in a radial plane passing through the longitudinal axis of said stalk roll.

4. The method according to claim 1 wherein said first flute affixed to said first stalk roll is further defined as comprising:
   a) a leading surface;
   b) a trailing surface angled with respect to said leading surface, wherein said trailing surface resides in a radial plane passing through the longitudinal axis of said stalk roll, and wherein the angle between said trailing surface and said leading surface is less than sixty degrees; and,
   c) a flute edge defined by said leading surface and said trailing surface.

* * * * *